US010387438B2

(12) United States Patent
Schmidt et al.

(10) Patent No.: US 10,387,438 B2
(45) Date of Patent: Aug. 20, 2019

(54) METHOD AND APPARATUS FOR INTEGRATION OF COMMUNITY-PROVIDED PLACE DATA

(71) Applicant: HERE Global B.V., Veldhoven (NL)

(72) Inventors: Andreas Schmidt, Berlin (DE); Alexander Grosse, Berlin (DE)

(73) Assignee: HERE Global B.V., Veldhoven (NL)

(*) Notice: Subject to any disclaimer, the term of this patent is extended or adjusted under 35 U.S.C. 154(b) by 733 days.

(21) Appl. No.: 14/853,439

(22) Filed: Sep. 14, 2015

(65) Prior Publication Data

US 2016/0004753 A1 Jan. 7, 2016

Related U.S. Application Data

(63) Continuation of application No. 12/478,484, filed on Jun. 4, 2009, now abandoned, which is a (Continued)

(51) Int. Cl.
*G06F 16/00* (2019.01)
*G06F 16/2458* (2019.01)
(Continued)

(52) U.S. Cl.
CPC ...... *G06F 16/2468* (2019.01); *G06F 16/2365* (2019.01); *G06F 16/24573* (2019.01); (Continued)

(58) Field of Classification Search
CPC ......... G06F 17/30241; G06F 17/30864; G06F 17/30867; G06F 17/30; G06F 16/29; G06F 16/9535; G06F 16/2465; G06F 16/435
See application file for complete search history.

(56) References Cited

U.S. PATENT DOCUMENTS 6,208,988 B1 3/2001 Schultz
6,229,922 B1 5/2001 Sasakawa et al.
(Continued)

FOREIGN PATENT DOCUMENTS

JP 2003344085 A 12/2003
WO 2007043752 A1 4/2007
(Continued)

OTHER PUBLICATIONS

Karam, Roula, et al. "Integration of similar location based services proposed by several providers." International Conference on Networked Digital Technologies. Springer, Berlin, Heidelberg, 2010.*
(Continued)

*Primary Examiner* — Nan Hutton
(74) *Attorney, Agent, or Firm* — Ditthavong & Steiner, P.C.

(57) ABSTRACT

An approach is provided for integrating place metadata provided by a community of metadata builders, including receiving registration data that indicates one or more values for a corresponding one or more attributes that describe a place. A place is associated with a geographic location. Providing an indication of match between the registration data and metadata for a predetermined place is also initiated. In some embodiments, a new entry for a set of predetermined places is generated based on validating the registration data and a negligible degree of match. In some embodiments, a unique identifier for the place is included in indication of match for either a new place represented by the registration data or a matching predetermined place.

20 Claims, 18 Drawing Sheets

Related U.S. Application Data continuation-in-part of application No. 12/414,101, filed on Mar. 30, 2009, now abandoned.

(51) Int. Cl.

| | |
|---|---|
| ***G06F 16/29*** | (2019.01) |
| ***G06F 16/907*** | (2019.01) |
| ***G06F 16/23*** | (2019.01) |
| ***G06F 16/2457*** | (2019.01) |
| ***G06Q 30/02*** | (2012.01) |
| ***G06F 16/9537*** | (2019.01) |

(52) U.S. Cl.

CPC ............ *G06F 16/29* (2019.01); *G06F 16/907* (2019.01); *G06F 16/9537* (2019.01); *G06Q 30/02* (2013.01)

(56) References Cited

U.S. PATENT DOCUMENTS

| | | | | |
|---|---|---|---|---|
| 6,487,495 | B1 * | 11/2002 | Gale | G01C 21/343 701/10 |
| 6,983,287 | B1 | 1/2006 | Jayanti et al. | |
| 7,224,827 | B2 | 5/2007 | Agar et al. | |
| 2002/0035432 | A1 | 3/2002 | Kubica et al. | |
| 2002/0121550 | A1 | 9/2002 | Gorbet et al. | |
| 2003/0078819 | A1 | 4/2003 | Hoffman et al. | |
| 2005/0278371 | A1 | 12/2005 | Funk et al. | |
| 2006/0212441 | A1 | 9/2006 | Tang et al. | |
| 2007/0067288 | A1 | 3/2007 | Chung | |
| 2007/0106455 | A1 | 5/2007 | Fuchs | |
| 2007/0118513 | A1 | 5/2007 | Iwasaki et al. | |
| 2008/0167980 | A1 | 7/2008 | Aaron et al. | |
| 2008/0200143 | A1 * | 8/2008 | Qiu | H04M 1/2535 455/404.2 |
| 2009/0210147 | A1 * | 8/2009 | Bauer | G01C 21/20 701/467 |
| 2009/0262015 | A1 * | 10/2009 | Kim | G01S 5/0252 342/357.31 |
| 2012/0047102 | A1 * | 2/2012 | Petersen | G06Q 30/0282 706/52 |

FOREIGN PATENT DOCUMENTS

| | | | |
|---|---|---|---|
| WO | 2007134249 | A2 | 11/2007 |
| WO | 2010113143 | A2 | 10/2010 |

OTHER PUBLICATIONS

Fu, Gaihua, Christopher B. Jones, and Alia I. Abdelmoty. "Building a Geographical Ontology for Intelligent Spatial Search on the Web." Databases and Applications. 2005.*

Jones, Christopher B., Harith Alani, and Douglas Tudhope. "Geographical information retrieval with ontologies of place." International Conference on Spatial Information Theory. Springer, Berlin, Heidelberg, 2001.*

Office Action for corresponding Chinese Patent Application No. 201080014448.9, dated Oct. 8, 2015, English Language Summary Included, 9 pages.

Chinese Office Action for related Chinese Patent Application No. 201080014448.9 dated Mar. 24, 2016, 10 Pages.

Chinese Office Action for related Chinese Patent Application No. 201080014448.9 dated Apr. 23, 2015, with English-language summary, 4 pages.

Office Action for corresponding Chinese Patent Application No. 201080014448.9 dated Oct. 20, 2014, with English-language summary, 7 Pages.

Office Action for corresponding Chinese Patent Application No. 201080014448.9 dated Feb. 8, 2014, with English-language summary, 8 Pages.

Office Action for corresponding Russian Patent Application No. 2011143394/08 dated Aug. 20, 2012, pp. 1-6.

International Preliminary Report on Patentability for corresponding International Application No. PCT/IB2010/051914 dated Oct. 4, 2011, pp. 1-9.

Notification Concerning Transmittal of International Preliminary Report on Patentability dated Oct. 13, 2011.

International Search Report for corresponding International Application No. PCT/IB2010/051914 dated Oct. 22, 2010, pp. 1-4.

Office Action for corresponding European Patent Application No. 10 758 141.5-1126, dated Jul. 24, 2018, 8 pages.

* cited by examiner

FIG. 2C

```
<place id="184385761"
uri="http://organization.com/homePlace/rest/v1.0/place184385761" >
<categories>
<category>Bar</category>
<category>Restaurant</category>
</categories>
<names>
<defaultName language="de">Türkische Kneipe</defaultName>
<alternativeNames>
<name language="en">Turkish Restaurant</name>
<name language="de">Türkische Kneipe Alternative 1</name>
<name language="de">Türkische Kneipe Alternative 2</name>
</alternativeNames>
</names>
```

FIG. 2D

```
<location>
<address>
<houseNumber>12</houseNumber>
<street>Invalidenstr.</street>
<city>Berlin</city>
<region>Berlin</region>
<zipCode>72145</zipCode>
<countryCode>DE</countryCode>
<exonyms>
<exonym language="en">
<street>Invaliden Street</street>
</exonym>
</exonyms>
</address>
<geoCoordinates>
<latitude>15.22122</latitude>
<longitude>17.33333</longitude>
</geoCoordinates>
</location>

<contact>
<phone>+49 30 1234566</phone>
<email>turkiye@berlin.de</email>
<website>http://turkiye.berlin.de</website>
</contact>
</place>
```

METHOD AND APPARATUS FOR INTEGRATION OF COMMUNITY-PROVIDED PLACE DATA

CROSS-REFERENCE TO RELATED APPLICATIONS

This application claims benefit as a Continuation of application Ser. No. 12/478,484, filed Jun. 4, 2009, which claims benefit as a Continuation-In-Part of application Ser. No. 12/414,101 filed Mar. 30, 2009, under 35 U.S.C. § 120, the entire disclosures of which are hereby incorporated by reference herein.

BACKGROUND

The use of wireless, mobile communication devices has become pervasive, and is rapidly overtaking the use of traditional wired devices. As users' mobility increases, there is an increasing demand for content associated with the user's past, current or expected future location. For example, a popular application is determining restaurants or banks or other retail outlets in proximity to a user's past, current or expected future location. However, those service providers attempting to provide such location-based content are confronted with many challenges, including the consumption of vast resources to assemble and quality control the location-based content data for an extensive region or for global coverage.

SOME EXAMPLE EMBODIMENTS

Therefore, there is a need for improved formation of location based content.

According to one embodiment, a computer-readable storage medium carries instructions which, when executed by a processor, cause an apparatus to at least perform receiving registration data that indicates one or more values for corresponding attributes that describe a place that is associated with a geographic location. An indication of a match between the registration data and metadata for a predetermined place is provided.

According to another embodiment, an apparatus comprises a processor and a memory storing executable instructions that if executed cause the apparatus to receive registration data that indicates one or more values for corresponding attributes that describe a place that is associated with a geographic location. An indication of a match between the registration data and metadata for a predetermined place is provided According to another embodiment, an apparatus comprises means for receiving registration data that indicates one or more values for corresponding attributes that describe a place that is associated with a geographic location. The apparatus includes means for providing an indication of a match between the registration data and metadata for a predetermined place.

According to another embodiment, a method includes receiving registration data that indicates a value for a subset of place metadata that includes a plurality of attributes that describe a place that is associated with a geographic location. The method also includes providing an indication of a match between the registration data and metadata for a predetermined place.

According to another embodiment, an apparatus comprises means for receiving registration data that indicates a value for a subset of place metadata that includes a plurality of attributes that describe a place that is associated with a geographic location. The apparatus also includes means for providing an indication of a match between the registration data and metadata for a predetermined place.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings, in which:

FIG. 2C and FIG. 2D illustrate an example XML document holding example place metadata, according to one embodiment;

DETAILED DESCRIPTION OF EXAMPLE EMBODIMENTS

Figure 1:
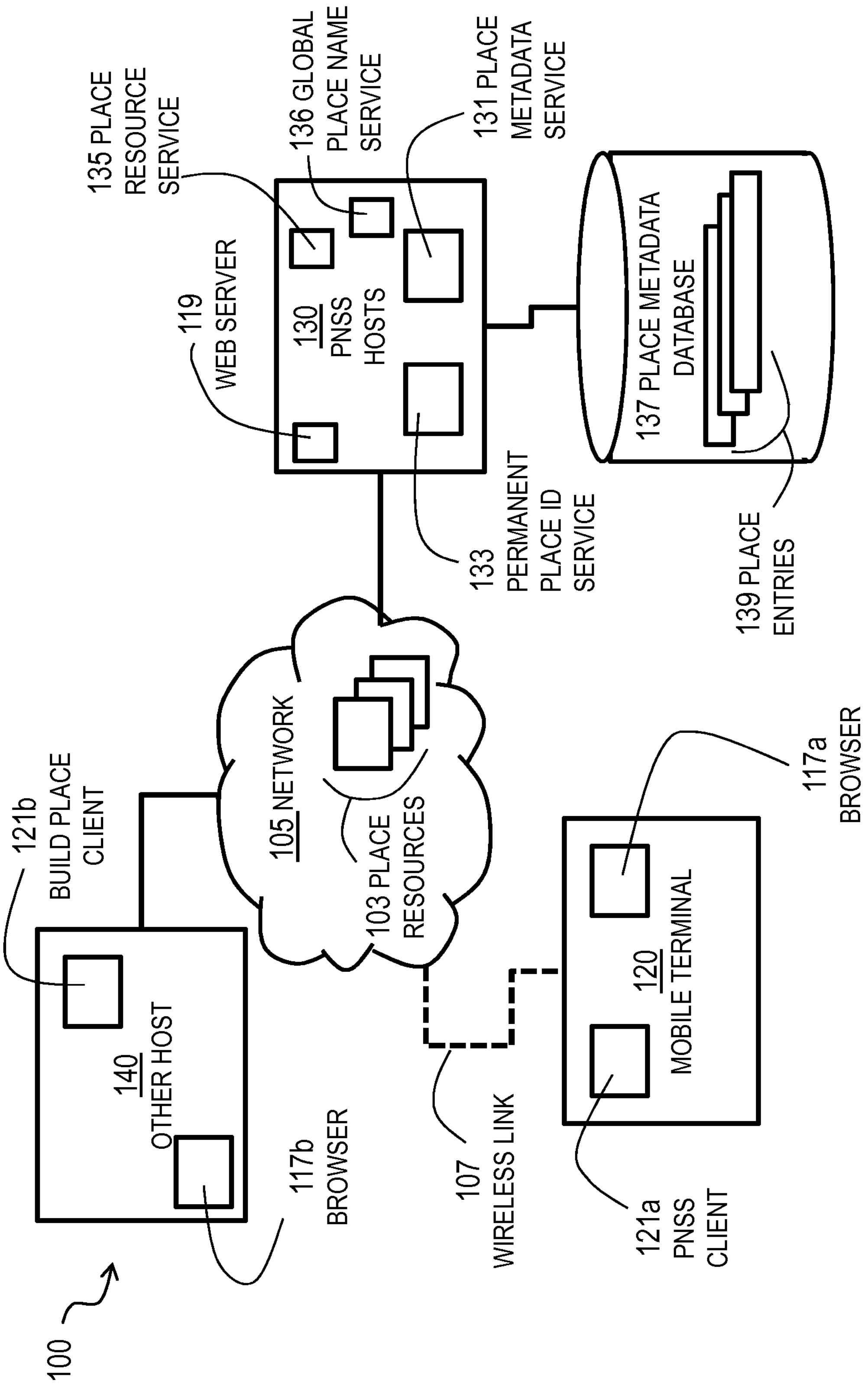
FIG. 1 is a diagram of a system for integrating place metadata from a community of place builders, according to one embodiment.

A method, apparatus, and software are disclosed for integration of community provided place data. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although several embodiments of the invention are discussed with respect to exchanging place metadata using extended markup language (XML) embedded in hypertext transfer protocol (HTTP) messages transmitted over a network between one client and two place service modules, a permanent place ID service and a place metadata service, embodiments of the invention are not limited to this context. It is explicitly anticipated that the metadata may be exchanged using any collection of attributes and values embedded in any network protocol or human interface between a community member and one or more processes operating on one or more computing devices with or without a network.

As used herein the term “place” refers to the semantics/usage of a location. Although a place is always associated with a location, it is an object independent of a location. That is, a place (such as a restaurant or business) might change its physical location (i.e. geographic coordinates) over time and multiple places (such as a hotel and a restaurant) might be associated with the same location. Thus, a place is associated temporally and spatially with a geographic location. A particular place is distinguished from other places by a collection of values (place metadata) for a corresponding set of attributes (place metadata parameters) that uniquely indicate the place. In addition to the place metadata that uniquely indicates a particular place, there are place resources in some embodiments.

Many organizations provide location related content and services (e.g. business directories, geographic information systems, restaurant guides, hotel booking services). Each of these organizations manages its specific set of metadata for its locations. Neither is this set of metadata standardized, nor does there exist an easy way to check whether two sets of metadata from independent organizations refer to the same location. Aggregation of metadata from various sources is a common task for many of these organizations. To ensure data quality and integrity, every organization has to implement data validation, enrichment, and duplicate removal on its own. On top of that, the community of place building organizations has to continuously revalidate their existing metadata (e.g. to identify entries that went out of business or moved to a different location. Therefore, there is a need for a system to integrate community-provided place data to assure data quality and avoid duplication.

In some embodiments, place resources for a single place are provided as one or more network resources, such as a collection of one or more files or directories or web pages, which is accessed by corresponding universal resource locator (URL) names. A domain name server (DNS) on a network resolves URL names into Internet Protocol (IP) addresses that are used to route messages sent across an IP network, as is well known in the art. Thus a user of a web browser can access those place resources, once given the URL names. In some embodiments, the place resources are not maintained separately from a central database of place metadata.

According to some embodiments, a set of web services called Place Namespace Services (PNSS) provide services related to integrating data to support the concept of a place. In a particular embodiment, the PNSS includes several modules. A Permanent Place ID Service (PPIDS) creates and finds unique identifiers (IDs) for a place. This service tries to avoid creating duplicate places (creating multiple place IDs for the same physical place) by using matching logic (by comparing the metadata attributes of a place). Duplicate avoidance cannot be guaranteed, therefore PPIDS provides a way to merge place IDs as metadata becomes available, which indicates the place IDs refer to the same place. The merge is accomplished by marking one of the place IDs as merged. This service still guarantees that a place will remain accessible by any ID that was once assigned to that place. A Place Metadata Service (PMDS) stores and finds a standardized set of core metadata associated with places. In some embodiments, a Place Resource Service (PRS) binds web resources (as URLs) to a place, and a Global Place Name Service (GPNS) registers a globally unique name, called a place ID, for a place. In many embodiments, the processes performed by these latter two modules are omitted or incorporated in one of the other depicted modules. For example, the function of the GPNS is included in the PPIDS 133 in some embodiments.

In some embodiments, the PNSS checks place metadata validity and avoids duplication by recognizing when place metadata for a new place resource closely matches place metadata for an existing place resource. Having access to the PNSS relieves organizations from maintaining the core metadata of their places on their own. PNSS takes the burden to validate and enrich a place’s core metadata, provides mechanisms to avoid duplicate creation and merge existing duplicates and allows organizations to register their own resources and services related to a place in a publicly accessible directory. By allowing several builders to contribute to the same shared place resources, a single builder’s efforts are leveraged to gain access to a much broader scope of place data than would be possible to build alone. On top of that, all organizations that provide resources (e.g. services or content) related to places can use the place ID to interconnect their resources.

The core problem that the PNSS has to solve, in these embodiments, is to identify a place based on the specific, potentially incomplete or even invalid set of metadata that users of the PNSS can provide. This feature is implemented in the PPIDS. To identify a place (and get its place ID) a user of the PNSS has to execute the register function of the PPIDS. This function expects some place metadata (at least name, location and category) and matches this data against predetermined place metadata known to the PNSS. In case there exists a perfect matching place in the PNSS, the PPIDS will return the place ID of this entry. Since one can’t expect that the data provided by the user matches exactly to place metadata stored in the PNSS (e.g. due to slightly different names, names in different languages, different category-levels, partially wrong address, outdated address), only returning exact matches would prevent the core task of the service to avoid creation of duplicate entries for the same place.

To address this problem, in some embodiments, PPIDS implements some fuzzy matching algorithm that matches places even if the metadata of the known places don't match exactly the metadata provided during registration. In this case PPIDS has to calculate some "quality-of-match" value, or degree of match value, that gives the user some hint about how close the data of each returned place is to the registration metadata the user did provide.

In an illustrated embodiment, the fuzzy matching algorithm contains various components including location identification, category definition, name resolution, vicinity detection, and previous selection tracking Location identification is based on commercially available address resolution services, such as the location reference object (LRO) digital map service of NAVTEQ™, and allows PPIDS to validate, enrich and identify the location of a place indicated by registration metadata. Category matching is performed by modelling categories of places as a combination of managed, globally-applicable "top level categories" and allowing additional arbitrary free text tags. Name matching is performed by maintaining multiple names that might be used to identify a place (both alternative names and translated names) and applying some word similarity measure, such as those used in spell checking algorithms. Vicinity matching (also called "nearby matching") is employed because not all places are addressable by a unique address (or a PNSS user might not have the valid address). Thus PPIDS implements some vicinity search that checks for matches with places that are located near the provided address or geolocation coordinates. Previous selection matching is performed in case the user provides metadata that differs from the required metadata, because a prior registration attempt might have the missing metadata. Thus previous registration requests are stored for each user or group of users.

Based on output from the various components of the matching algorithms, in the illustrated embodiment, PPIDS calculates the overall "quality-of-match" or degree of match for each of the predetermined places. PPIDS returns data identifying a list of one or more candidate places that demonstrate a degree of match value above a predetermined threshold. This list might also include a candidate for a new entry derived from the registration metadata, e.g., by correcting evident misspellings or transposed numerals. The PPIDS also returns, for each candidate in the list, a candidate token that indicates a difference between the registration metadata and the candidate place metadata. The user then selects one of the candidates, such as by executing a "selectCandidate" function of PPIDS, by submitting the candidate token for the selected candidate. PPIDS then returns the new or previously existing (extant) place ID of the selected candidate. Based on the token for the selected candidate, the PPIDS is able to "learn" which metadata was used identify a place and automatically create some additional matching metrics and heuristics to score the differences indicated in the token. These metric may be applied to future registration efforts by the same user or future registration efforts by several or all users.

FIG. 1 is a diagram of a system 100 for integrating place metadata from a community of place builders, according to one embodiment. The system 100 includes a communications network 105, and network nodes that include mobile terminal 120, place namespace service (PNSS) hosts 130 and other host 140. Community members operate on mobile terminal 120 or other host 140 and have their metadata properly integrated by the modules on the PNSS hosts 130.

In various embodiments, nodes 120, 130, 140 can be any type of fixed terminal, mobile terminal, or portable terminal including desktop computers, laptop computers, handsets, stations, units, devices, multimedia tablets, Internet nodes, communicators, Personal Digital Assistants (PDAs), mobile phones, mobile communication devices, audio/video players, digital cameras/camcorders, televisions, digital video recorders, game devices, positioning devices, rack-mounted computers or computer blade systems, or any combination thereof. Moreover, the nodes may have a hard-wired energy source (e.g., a plug-in power adapter), a limited energy source (e.g., a battery), or both. It is further contemplated that the nodes 120, 131, 140 can support any type of interface to the user (such as "wearable" circuitry, etc.). In the illustrated embodiment, node 120 is a wireless mobile terminal (also called a mobile station and described in more detail below with reference to FIG. 10). The mobile terminal 120 is connected to network 105 by a wireless link 107.

Community-shared place resources 103 that describe or provide services related to places reside on nodes in network 105 in the illustrated embodiment. In some embodiments, shared place resources 103 are omitted.

By way of example, the communication network 105 of system 100 can include, in various embodiments, one or more wired and/or wireless networks such as a data network (not shown), a wireless network (not shown), a telephony network (not shown), or any combination thereof, each comprised of zero or more nodes. It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network, or any combination thereof. In addition, the wireless network may be, for example, a cellular network and may employ various technologies including code division multiple access (CDMA), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, wireless fidelity (WiFi), satellite, and the like. In various embodiments, communication network 105, or portions thereof, can support communication using any protocol, for example, the Internet Protocol (IP).

The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, redundancy, and regional partitioning, among others. A well known client process available on most nodes connected to a communications network is a World Wide Web client (called a "web browser," or simply "browser") that interacts through messages formatted according to the hypertext transfer protocol (HTTP) with any of a large number of servers called World Wide Web servers that provide web pages. In the illustrated embodiment, mobile terminal 120 and other host 140 include browser 117*a* and browser 117*b*, respectively; and hosts 130 include web server 119.

As depicted in FIG. 1, in the illustrated embodiment, PNSS hosts 130 include web server 119, Place Metadata Service (PMDS) module 131, Permanent Place identifier (ID) Service (PPIDS) module 133, Place Resources Service (PRS) module 135, and Global Place Name Service (GPNS) module 136, all described above. One or more of these modules access a place metadata data structure, such as place metadata database 137. The place metadata data structure includes a place entry 139 for every different place registered with the PNSS. In an illustrated embodiment, PPIDS, PMDS and PRS are web services that provide an HTTP based application programming interface (API) that follows the design principles for RESTful web services. In some embodiments, such services are accessed by a browser 117 with a human operator providing manual input required by the API. Currently, no standard browser directly supports the HTTP-PUT operation or is capable of directly creating XML messages, so in such embodiments, the service is accessed with the help of a JavaScript based browser extension. Alternatively, a special place building client process, e.g., PNSS client 121, can automatically provide some or all of the input required by the API using one or more HTTP messages. It is expected that the number of places that are going to be managed might one day extend the capabilities of a single host. Therefore in some embodiments multiple hosts 130 are deployed across network 105, each host responsible for a specific "area" of the world In the illustrated embodiment, the modules of PNSS hosts 130 are the centralized services invoked by a community of place builders distributed across network 105, such as an operator of mobile terminal 120 or other host 140. Mobile terminal 120 includes a PNSS client 121*a*, and other host 140 includes PNSS client 121*b*, collectively referenced hereinafter as PNSS client 121. The PNSS client 121 interacts with one or more modules on PNSS hosts 130 to allow a user to submit place metadata for registration with the PNSS and obtain the unique place ID for the place indicated by the metadata.

According to the illustrated embodiment, armed with the place ID for a place, a user can identify a particular place resource 103 where information and service about that place are located on the network 105, such as by the URL for a webpage of links to descriptions and services for that place. Such a webpage can be accessed by the browser 117 on the user's node based on that URL in some embodiments. In other embodiments, separate place resources 105 are not used.

Although a particular set of nodes, processes, and data structures are shown in FIG. 1 for purposes of illustration, in various other embodiments more or fewer nodes, processes and data structures are involved. Furthermore, although processes and data structures are depicted as particular blocks in a particular arrangement for purposes of illustration, in other embodiments each process or data structure, or portions thereof, may be separated or combined or arranged in some other fashion. For example, in some embodiments, the PRS 135 and GPNS 136 are included in PMDS 131 and PPIDS 133, respectively; and PPIDS 133 is embedded in a web server 119; and the PNSS client 121 includes a browser 117.

Figure 2A:
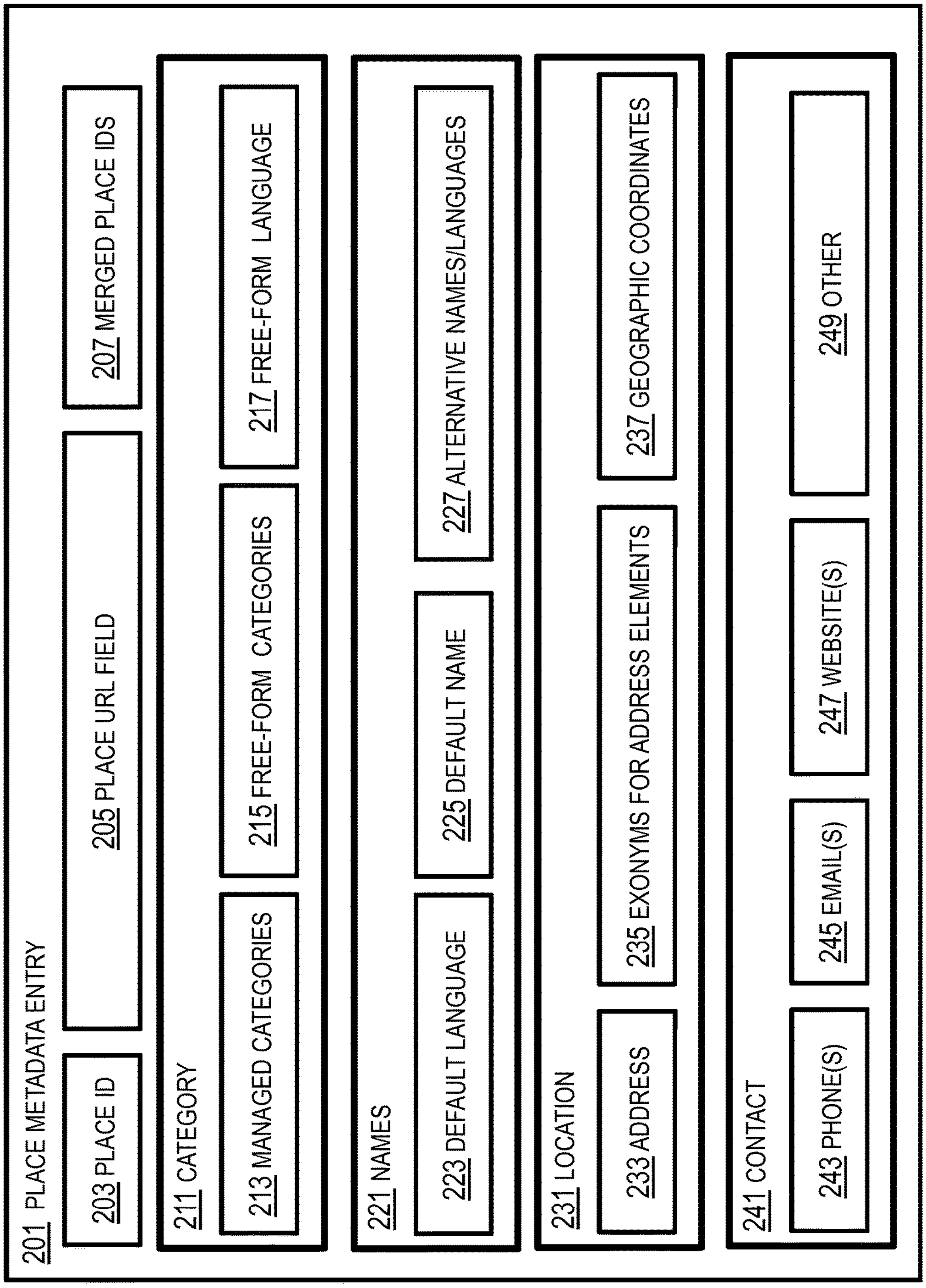
FIG. 2A is a diagram of an entry for a place metadata data structure, according to one embodiment.

FIG. 2A is a diagram of an entry 201 for a place metadata data structure, according to one embodiment. The entry 201 embodies a model for place metadata that allows the detection of duplicates. The place data structure entry 201 includes a place ID field 203, a place URL field 205, merged place IDs field 207, place category fields 211, place names field 221, place location fields 231 and place contact fields 241. Example values for some of these fields are presented in FIG. 2B, FIG. 2C and FIG. 2D, described in more detail below.

In some embodiments, place metadata is transferred from one node to another in one or more HTTP messages. One manner for transporting place metadata in an HTTP message is to include the place metadata in an extended markup language (XML) document. XML documents allow values for any of one or more predefined parameters in a dictionary to be exchanged among nodes that have access to that dictionary. XML parameters can be nested and, for any level of nesting, can be listed in any order. FIG. 2C and FIG. 2D illustrate an example XML document holding example place metadata; according to one embodiment. As is well known in the art, an XML parameter value is given between a parameter start indicator <name> and a parameter end indicator </name> where name represents the parameter name. This example document does not include a merged place IDs field 207 or other contact field 249.

In the illustrated embodiment, the place ID field holds data that indicates the unique identifier for a particular place. In some embodiments, the place URL field 205 holds data that indicates a primary place resource 103 on the network for obtaining information and services related to the place. Links to multiple other resources, if any, related to that place are found at the primary place resource.

In some embodiments, the primary place resource is a web page hosted by the organization that registered the place and named using the place ID. For example, in FIG. 2C, the place ID is 184385761, and the place resource is a web page (using HTTP) named 184385761 in directory homePlace at domain organization.com as given by the value of the URL in the start indicator for the place parameter. The URL included in the xml-place representation is the URL to the PMDS-instance that did provide the place metadata representation (a kind of self reference). This becomes especially important in case the PMDS is regionally partitioned across multiple hosts as described above. In some embodiments, place resources are managed independently from the core attributes in the PRS. In these embodiments, the shared element between PMDS and PRS is the placeID.

The merged place IDs field 207 holds data indicating the place IDs, if any, for metadata entries that were originally distinct but were subsequently identified as the same place as the place described in entry 201. In other embodiments, when a place gets merged, data indicating the target place with which the current place is merged is indicated in the field 207, i.e., a forward reference, linking to the target place which will be the remaining place. Any attempt to a "merged" place will result in an immediate redirect to the target place. That way the placeID remains usable, but only the target placeID is returned.

Figure 2B:
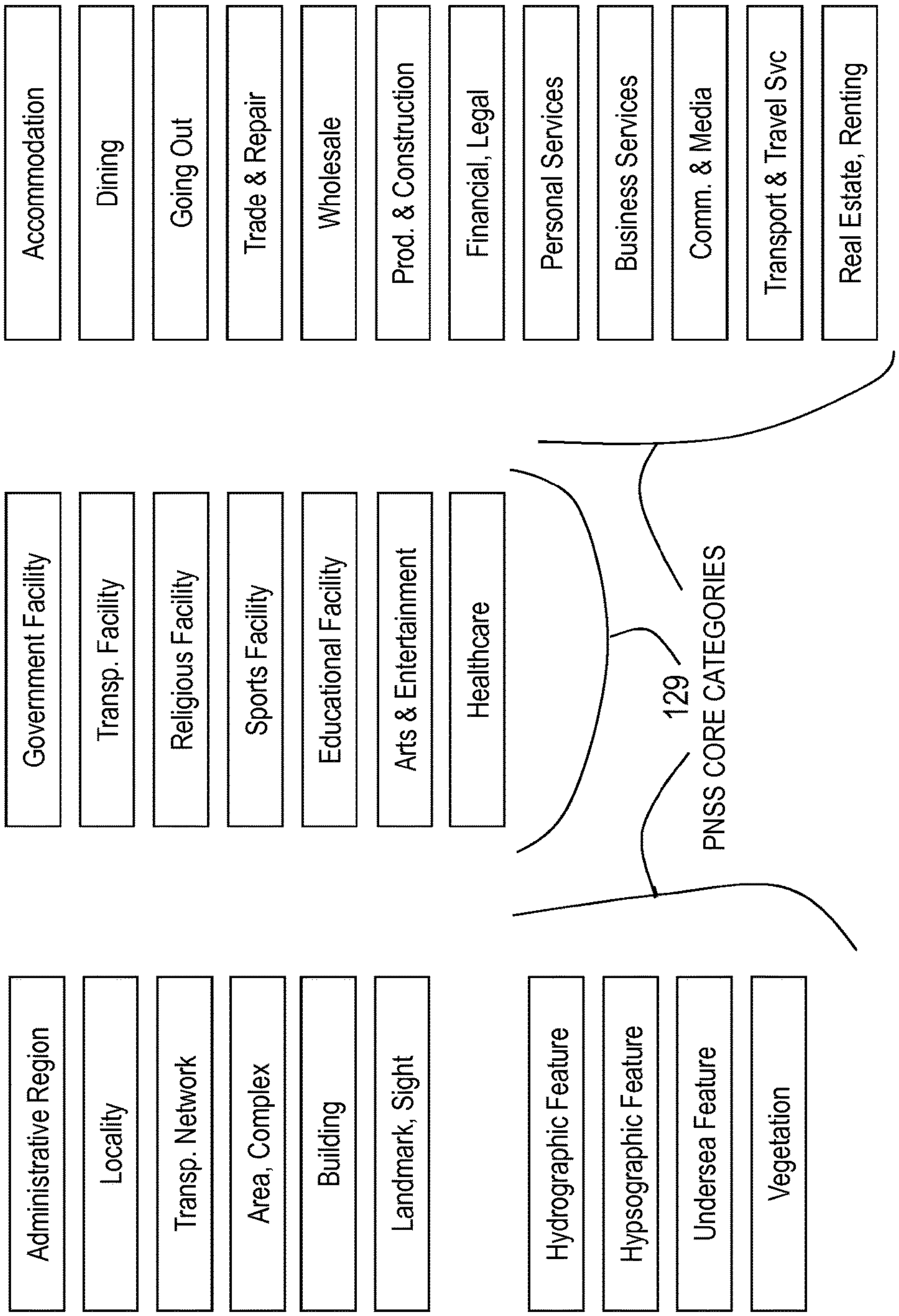
FIG. 2B illustrates example core categories, according to one embodiment.

In the illustrated embodiment, the categories fields 211 include managed categories field 213, free-form categories field 215 and free-form language field 217. In the illustrated embodiment, PNSS introduces a very small core category tree that is centrally managed to support distinction of places that share the same address (e.g. a hotel that resides in a famous building; restaurant within a hotel) when the names might not allow a comparison due to different languages or entries by different users at different times. Every core category is maintained in a category data structure and contains a unique identifier, a semantic description and a list of tags that name the categories in various languages. Published category systems (e.g. EuroStat, GNS Feature Codes) that are centrally managed are mapped to the PNSS core categories. Each such extended category belongs to a single category system that is managed by a single provider. The semantic concepts that define a category are collected in a dictionary. Every place is associated with at least one of these core categories, as indicated by a category ID in the managed category field 213. FIG. 2B illustrates example core categories, according to one embodiment. For example, in FIG. 2C, the categories are “Bar” and “Restaurant” but should also include the core category “dining” from FIG. 2B.

In the illustrated embodiment, PNSS allows assigning arbitrary category tags (a free text keyword and its language) to a place. PNSS users are free to assign their own categories through tags to a place. Translations of concepts associated with a category are stored as tags. These arbitrary tags and their associated languages are indicated by the data in the free-form categories field 215 and free-form language field 217. The Bar and Restaurant categories can be treated as arbitrary tags depicted in FIG. 2C.

In the illustrated embodiment, the names fields 221 hold data that indicates a name of the place and zero or more alternatives, and includes default language field 223, default name field 225 and alternative names/languages field 227. The default language field 223 holds data that indicates the default language used for the names and address of the place. For example, the default language is the predominant language spoken at the location of the place. In some embodiments the default language is another choice, such as English, which is widely spoken throughout the world. In FIG. 2C, the default language is German (Deutsch, represented by the abbreviation “de”) in the start indicator for the defaultName parameter. The default name field 225 holds data that indicates the default name for the place in the default language. In FIG. 2C, the default name is “Türkische Kneipe” (which means Turkish Restaurant in the default language, German).

In the illustrated embodiment, the alternative names/languages field 227 holds data that indicates other names for the place and the associated language. Thus a different alphabet/character associated with the different language can also be used to name and therefore subsequently identify the place. Similarly, different names in the same language can be indicated in field 227. In FIG. 2C, the alternative names include the English name “Turkish Restaurant” in English, represented by the abbreviation “en.” Two German language alternative names for the restaurant are also indicated in FIG. 2C.

In the illustrated embodiment, the location fields 231 hold data that indicates a geographic location of the place, and includes address field 233, exonyms for address elements field 235 (where exonyms refer to names in different languages) and geographic coordinates field 237. The address field 233 holds data that indicates the postal address of a place in the default language. For example, in FIG. 2D, the German language address is “12 Invalidenstr. Berlin 72145 DE” as indicated in separate XML parameters for houseNumber, street, city, region, zipCode, and country.

In the illustrated embodiment, the exonyms for address elements field 235 holds data that indicates names for address elements in different languages than the default or local language. The exonym field also indicates the language, such as by the abbreviation “en” for English. For example, in FIG. 2D, the English language street name is “Invaliden Street” as indicated by the data in the XML exonyms parameter.

In the illustrated embodiment, the geographic coordinates field 237 holds data that indicates the geographic position of the place, such as Global Positioning System (GPS) coordinates or latitude and longitude values with sufficient precision. For example, in FIG. 2D, the latitude is 15.22122 degrees (positive degrees signify North) and the longitude is 17.33333 degrees (positive degrees signify East), as indicated by values in separate XML parameters.

In the illustrated embodiment, the contact fields 241 hold data that indicates non-postal addresses for contacting one or more organizations or persons associated with a place. Contact information in fields 241 provides a useful way to distinguish among entities with similar names at the same location, such as related businesses in the same office building. The contact fields 241 include phone field 243, email field 245, website field 247 and other field 249. The phone field 233 holds data that indicates one or more telephone numbers associated with a place. Similarly the email field 245, website field 247 and other field 249, hold data that indicates one or more email addresses, website URLs, and other contact data, respectively, associated with the place, if any. For example, in FIG. 2D, the contact addresses are as indicated by values in separate XML parameters.

While the depicted fields in FIG. 2A are shown as integral blocks of data in a particular order in a record in a single structure for purposes of illustration, in other embodiments one or more fields, or portions thereof, are arranged in a different order on one or more records in one or more data structures on one or more nodes connected to a communications network, e.g., network 105. In some other embodiments, one or more depicted fields or portions thereof are omitted, or additional fields are included.

As described in more detail below with reference to FIG. 6A through FIG. 6E, in the illustrated embodiments, a browser or PNSS client process interacts with the PNSS by exchanging messages, such as HTTP messages, with the PNSS modules. As an early step, the user sends a registration message to attempt to register a place with the PNSS. The message must include enough information to determine a degree of match with predetermined places in a metadata data structure. According to the example PNSS API, the message to register a place must contain some place metadata and the name of the provider of the place metadata. The place metadata must include at least a proposed core category, a proposed default name and language, and either an address or a geographic coordinate. All other metadata that the user knows for the place should also be included in order to fill the metadata fields of a new entry in the data structure or to update the metadata in a pre-existing entry.

Figure 3A:
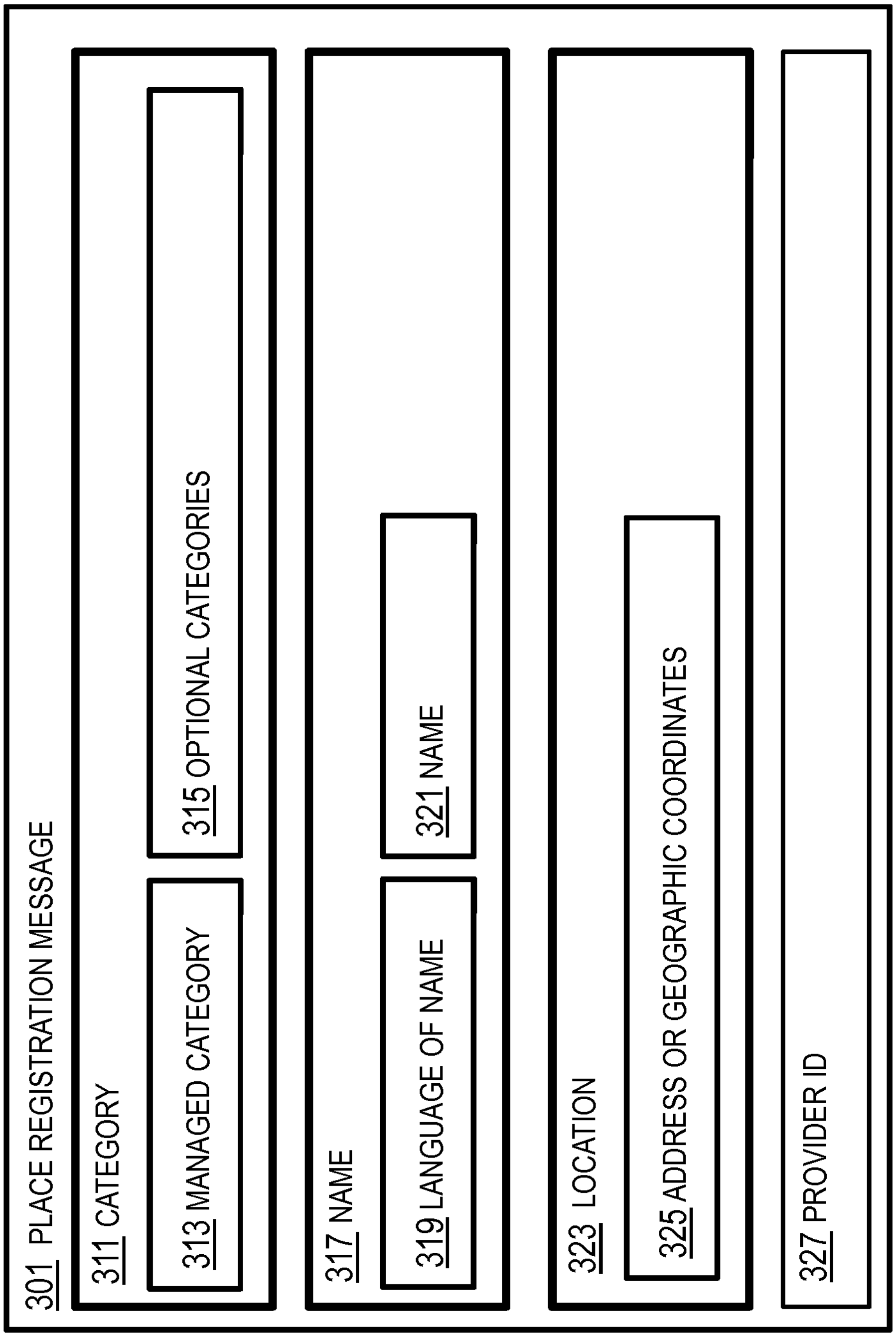
FIG. 3A is a diagram of a place registration message, according to one embodiment.

FIG. 3A is a diagram of a place registration message 301, according to one embodiment. The place registration message includes a category field 311, a name field 317, a location field 323 and a provider ID field 327. Although the depicted fields in FIG. 3A are shown as integral blocks of data in a particular order in a single message for purposes of illustration, in other embodiments one or more fields, or portions thereof, are arranged in a different order in one or more messages among two or more processes. In some other embodiments, one or more depicted fields or portions thereof are omitted, or additional fields are included.

In the illustrated embodiment, the category field 311 includes a managed category field 313 and an optional categories field 315 for carrying data that indicates one or more core categories and one or more free-form tags, respectively, as described above. The name field 317 includes a language field 319 and a name field 321 for carrying data that indicates the proposed default language and the default name in that language, respectively.

In the illustrated embodiment, the location field 323 includes field 325 for carrying data that indicates either or both of a postal address in the default langue or the geographic coordinates, as described above, or both.

In the illustrated embodiment, the provider identifier (ID) field 327 carries data that indicates the organization or person who is attempting to add or otherwise register the place to the community's shared places.

According to an example embodiment, the PNSS API provides for place registration message 301 to be an XML document in the body of an HTTP POST message. The same XML parameter dictionary is used as used for the XML document illustrated in FIG. 2C and FIG. 2D.

Figure 3B:
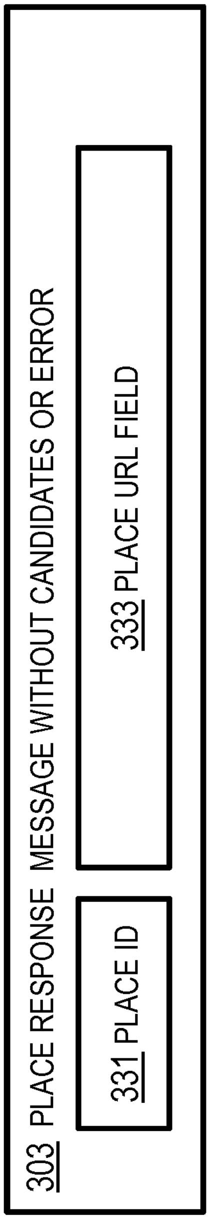
FIG. 3B is a diagram of a place response message with a single place identifier, according to one embodiment.

FIG. 3B is a diagram of a place response message 303 with a single place identifier, according to one embodiment. A message of this type is returned when the registration metadata exactly matches the corresponding metadata of a place already in the place metadata data structure, or when the registration metadata indicates a new place not already in the metadata data structure. Place response message 303 includes a place ID field 331 and a place URL field 333. The place ID holds data indicating the unique place ID of the new or existing place that matches exactly the registration metadata. The place URL field 333 field holds data that indicates the web page where links to the description or services related to the place should be added and where links to existing descriptions and services, if any, can be found. In some embodiments, the place URL field 333 just links to the PMDS's entry for that place. It's just a second way to provide the value of the location header described next for an environment where there might be a problem accessing/displaying http-headers.

According to an example embodiment, the PNSS API provides for response message 303 to be an XML document in the body of an HTTP message, using the XML parameters illustrated in FIG. 2C and FIG. 2D. In case of a perfect match to a preexisting place the response will return status code 303. When a new place is created the response will return status code 201. The HTTP header "Location" will contain the URL linking to the place's metadata in the PMDS. The response body will include the XML representation of the place ID.

Figure 3C:
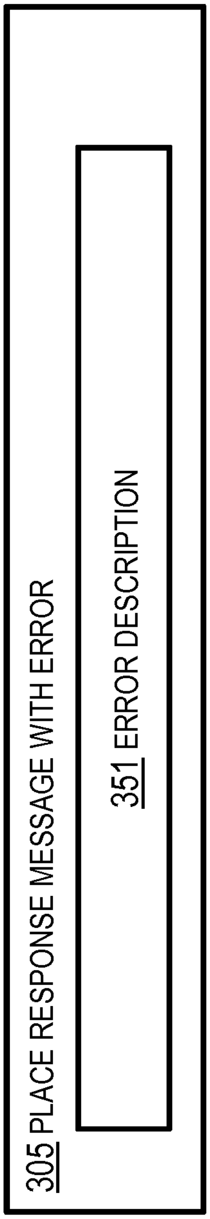
FIG. 3C is a diagram of a place response error message, according to one embodiment.

FIG. 3C is a diagram of a place response error message 305, according to one embodiment. A message of this type is returned when the registration metadata causes a problem for the PNSS. Place response message 305 includes an error description field 351 that carries data that indicates the type of error. According to an example embodiment, the PNSS API provides for response message 305 to be an XML document in the body of an HTTP message. In case the registration metadata does not pass validation performed by the PNSS, the response message 305 returns status code 400. The response body contains an XML representation, e.g., "Error! Reference source not found" Example errors are: "Invalid data," if the place is missing any required attributes; "Invalid address," if the address data is invalid or not correct (e.g., the address is not recognized or the geographical coordinates are incorrect).

Figure 3D:
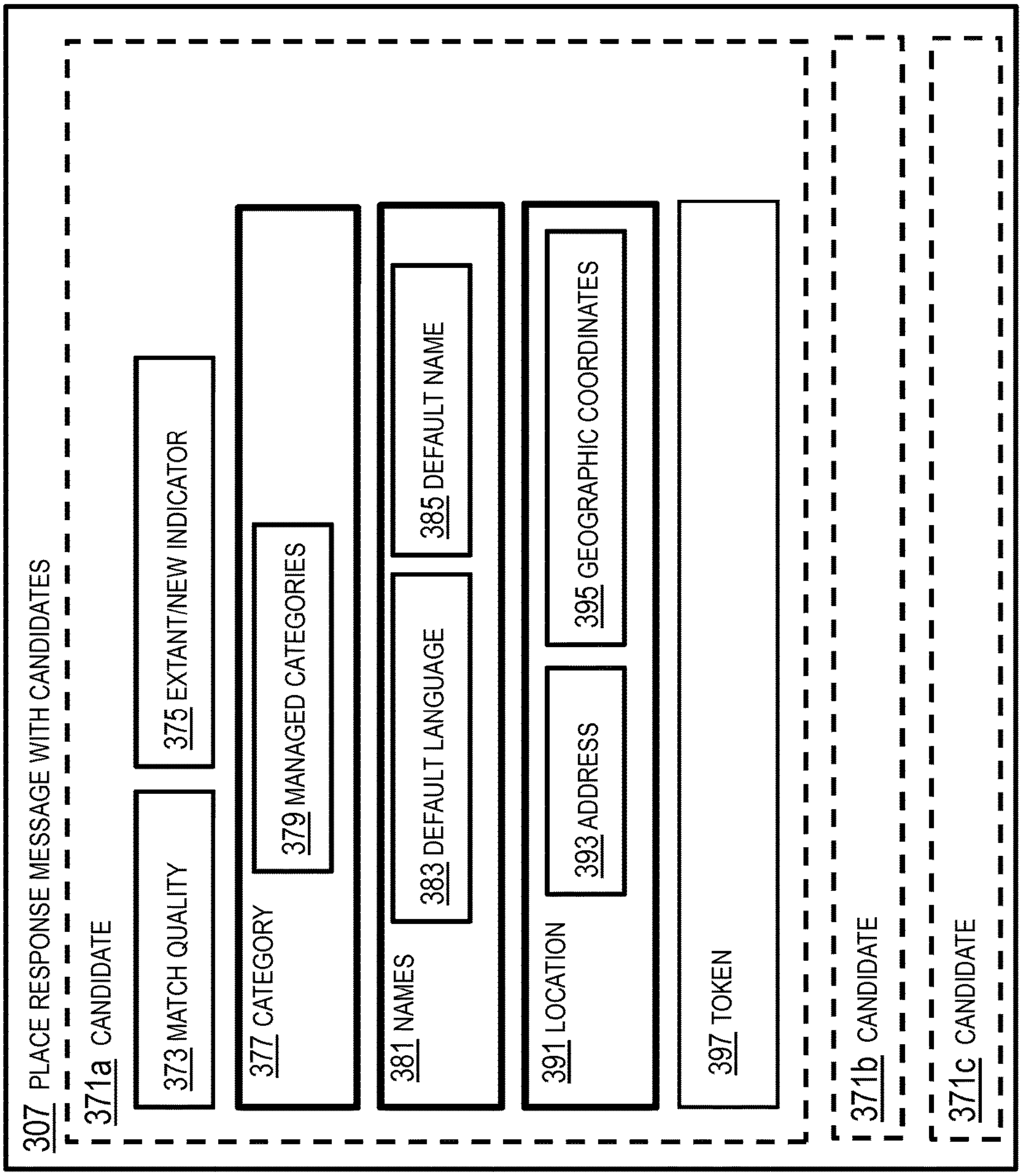
FIG. 3D is a diagram of a place response message with one or more candidate places, according to one embodiment.

FIG. 3D is a diagram of a place response message 307 with one or more candidate places, according to one embodiment. A message of this type is returned when the registration metadata is a partial match for one or more new or predetermined places. Place response message 307 includes one or more candidate fields, e.g., candidate field 371*a*, candidate field 371*b*, and candidate field 371*c*, collectively referenced hereinafter as candidate fields 371. Each candidate field 371 includes a match quality field 373, an extant/new indicator field 375, a category field 377, a names field 381, a location field 391 and a token field 397, as depicted for candidate field 371*a*.

In the illustrated embodiment, the match quality field 373 holds data that indicates a degree of match between the registration metadata and the metadata of the candidate place. The degree of match is less than a perfect match and greater than a predetermined threshold value for the degree of match. Any method may be used to express the degree of match, e.g., a decimal value between 0.0 for no match and 1.0 for perfect match, or an integer between 0 for no match and 255 for a perfect match. Any measure of similarity may be used to generate the degree of match. In the illustrated embodiment, fuzzy logic is used to simultaneously consider and properly weight similarities in category, name, location and contact information in the place metadata. In some embodiments, one or more properties of the fuzzy logic algorithm are learned based on differences between registration metadata and the metadata of candidates selected by previous users of the PNSS.

In the illustrated embodiment, the extant/new indicator flag 375 holds data that indicates whether the candidate is a new place with valid metadata or an extant place already in the place metadata data structure.

In the illustrated embodiment, the category field 377 includes a managed categories field 379 that holds data that indicates the managed categories of the candidate place. Similarly, the name field 381 includes a default language field 383 that holds data that indicates the default language of the candidate place, and a default name field 385 that holds data that indicates the name of the candidate place in the default language. The location field 391 includes an address field 393 that holds data that indicates the address in the default language of the candidate place, and a geographic coordinates field 395 that holds data that indicates the geographic coordinates of the candidate place.

In the illustrated embodiment, the token field 397 holds data that indicates the differences between the candidate metadata and the registration metadata. The data in the token field 397 is used to efficiently indicate a candidate selected by the user and reconstruct the candidate metadata from the registration metadata.

According to an example embodiment, the PNSS API provides for response message 307 to be an XML document in the body of an HTTP message, using the XML parameters illustrated in FIG. 2C and FIG. 2D, with the addition of an XML parameter token. When one or more possible candidates are available but there is no perfect match, the response will return status code 300. The response body contains an XML representation with a list of candidates. A user can choose one of these candidates and receive the place ID for that candidate through the select candidate resource of the API.

Figure 4A:
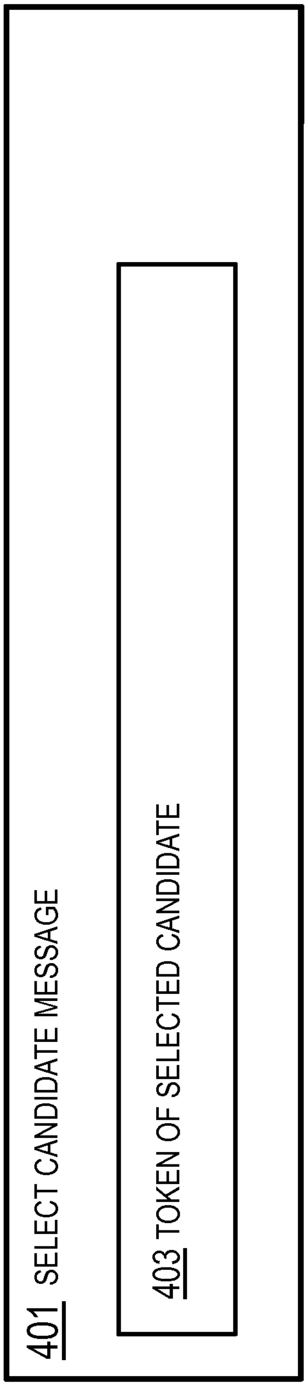
FIG. 4A is a diagram of a message for selecting a candidate, according to one embodiment.

FIG. 4A is a diagram of a message 401 for selecting a candidate, according to one embodiment. The message 401 includes a selected candidate token field 403 that carries data that indicates the token provided in message 307 for the one candidate that is selected. The selected candidate is one that the PNSS user understands is the place the user meant to register. If no candidate describes the place the user intended, then the user must review and revise the original registration metadata, and submit the revised metadata in a new registration message.

According to an example embodiment, the PNSS API provides for a select candidate request that allows the PNSS user to choose one of the proposed candidates of a previous POST operation. This operation can be used for either selecting a preexisting place with slightly different metadata or creating a new place that has slightly different metadata, e.g., because it includes some corrected or enhanced metadata. The message body includes an XML document with a value in an XML token parameter for the candidate token of the selected candidate out of the response body of the previous POST operation. In response, the PNSS client receives the candidate place ID, e.g., in place response message 303, described above.

Figure 4B:
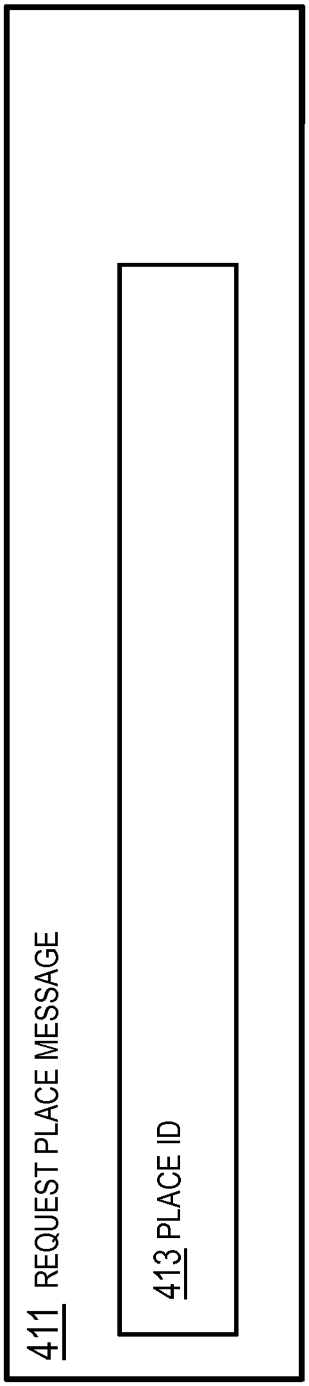
FIG. 4B is a diagram of a message for requesting a place resource, according to one embodiment.

FIG. 4B is a diagram of a message 411 for requesting a place resource, according to one embodiment. This request is directed to the PMDS 131 and includes a place ID field 413. The place ID field holds data that indicates a value for the unique place identifier. In response, the PNSS client receives the metadata for the place, including the place resource where links to existing description and services related to the place can be obtained, and where links to new descriptions and services can be added.

According to an example embodiment, the PNSS API provides for the place metadata service (PMDS) to allow a PNSS user to read and manage the core metadata of a place. Therefore, every place is modeled as a resource indicated by the URL returned in field 333 of message 303. The resource provides a set of operations and sub-resources. An HTTP GET message returns the metadata of the place with the place ID as specified by the last URL segment. The HTTP response message includes a Status Code. When a place with a place ID matching the last URL segment exists, the response will return status code 200. The response body will contain the XML representation of the place as depicted in FIG. 2C and FIG. 2D. When no place with a place ID that matches the last URL segment exists, then the response will return status code 404.

According to an example embodiment, the PNSS services are divided among multiple modules. In the following description, the processes at the place metadata service (PMDS) module 131 and the Permanent Place ID Service (PPIDS) module 133 are described with reference to FIG. 5A and FIG. 5B, respectively. In other embodiments, two or more of these modules are combined into a single module that performs the steps of both processes.

Figure 5A:
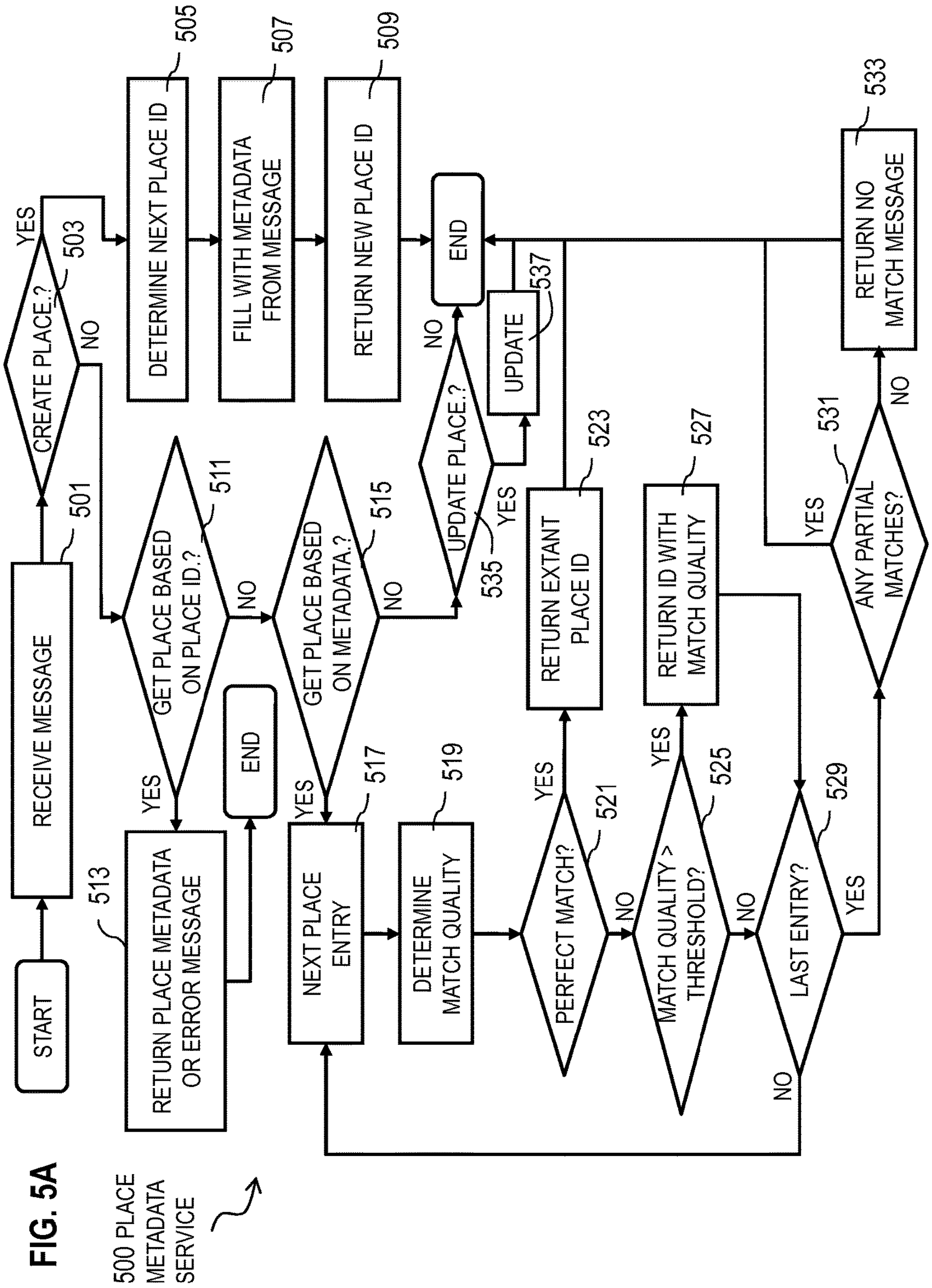
FIG. 5A is a flowchart of a process at a place metadata service, according to one embodiment.
Figure 5B:
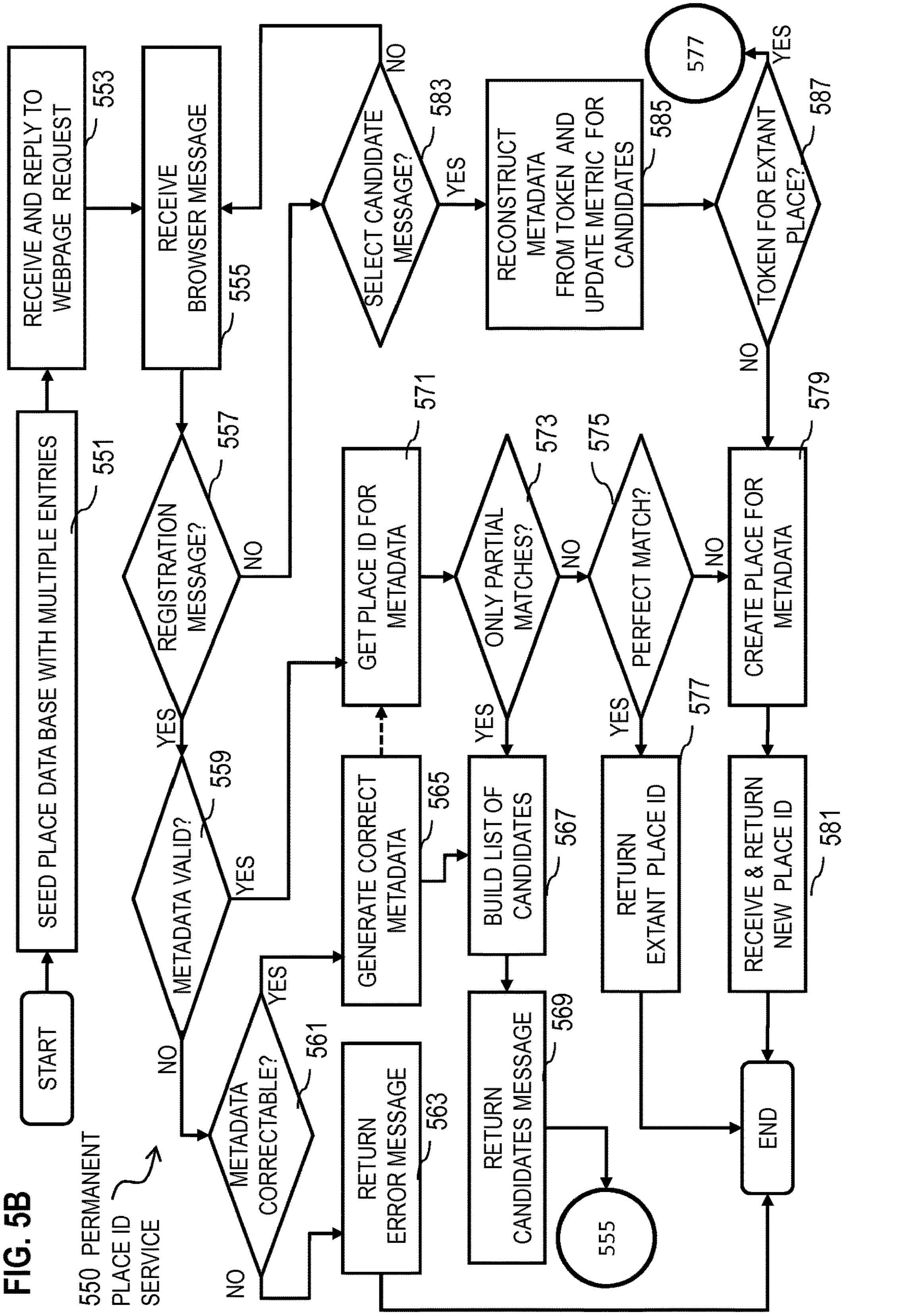
FIG. 5B is a flowchart of a process at a permanent place ID service, according to one embodiment.

FIG. 5A is a flowchart of a process 500 at a place metadata service (PMDS), according to one embodiment. Although steps in FIG. 5A and subsequent flow chart FIG. 5B are show in a particular order for purposes of illustration, in other embodiments, one or more steps may be performed in a different order or overlapping in time, in series or in parallel, or one or more steps may be omitted or added, or changed in some combination of ways.

In the illustrated embodiment, in step 501, a message is received, such as an XML document in the body of an HTTP message. In step 503 it is determined whether the message indicates place metadata for a new place to be created.

If so, then in step 505 a next place ID is determined in the illustrated embodiment. Any method may be used to determine the next place ID. In some embodiments, the next available place ID is generated by incrementing the last place ID; in some embodiments the place ID is determined by a hash function. In some embodiments, the next place ID is determined by sending a request message for the next place ID to a Global Place Name Server (GPNS) 136. In step 507 a new entry is added to a place metadata data structure with the new place ID. The values of the metadata received in the create message are stored in the new entry fields, as depicted in FIG. 2A. In step 509, the new place ID and associated place resource are returned to the module that sent the create message.

If the message does not indicate a new place is to be created, then in step 511 in the illustrated embodiment, it is determined whether the message indicates to retrieve place metadata based on a place ID provided in the message. If so, then in step 513 the place metadata for the given place ID is returned to the module that sent the message, e.g., in an XML document like that depicted in FIG. 2C and FIG. 2D in the body of an HTTP message. However, if such a place ID is not valid, then an error message is returned, e.g., like message 306, with a description of the error, or with an error code.

If the message received is not a request to retrieve metadata based on a place ID, then in step 515, in the illustrated embodiment, it is determined whether the message is a request to retrieve a place ID based on metadata included in the message. If not, then the message is further reviewed in step 535, described below. If so, then in step 517 the next entry in the place metadata data structure is retrieved. In some embodiments the next entry retrieved is the next entry within a vicinity of a location indicated in the metadata provided in the received message.

In the illustrated embodiment, n step 519 a quality of match is determined between the metadata in the message received (message metadata) and the metadata in the data structure entry (entry metadata). Any method may be used to determine the quality of match. In some embodiments, the quality is computed as a degree of match determined using a fuzzy logic algorithm that takes account of location identification, category definition, name resolution, vicinity detection, and previous selection tracking, as described above. In other embodiments, the fuzzy logic is left to the PPIDS, and the match quality determined in the PMDS merely indicates one of three levels of matching: a first level for no match of any metadata except category, a second level for complete match of all metadata, and a third level for match of at least one metadata parameter other than category.

In step 521, in the illustrated embodiment, it is determined whether there is a perfect match of all metadata in the message with the corresponding metadata in the entry. If so, then in step 521, the place ID of the entry is returned as an extant place ID, and processing of the received message is complete.

If there is not a perfect match, then in step 525, in the illustrated embodiment, it is determined whether the degree of match exceeds a predetermined threshold or falls into the third category of match quality. If so, then there is a partial match and the place ID of the entry is returned along with the value of the match quality level.

In step 529, in the illustrated embodiment, it is determined if the entry just examined is the last entry in the vicinity. If not, then the next entry is selected in step 517. If so, then it is determined in step 531 whether any partial matches were obtained (e.g., whether step 527 was executed at least once). If so, then the processing of the message is complete and the process ends. If not, then a message is returned indicating no match for the message metadata.

In step 535, in the illustrated embodiment, it is determined if the message received is to update the metadata at an existing entry. If not, then the message is ignored and the process ends. If so, then in step 537, the metadata of an existing entry is updated. For example, new metadata is added to blank fields, metadata in a field is replaced, metadata in a field is deleted, or the entry is deleted, or merged with a different entry. An entry is merged, for example, by indicating one entry as the dominant entry, using metadata from the subordinate entry only in blank fields in the dominant entry, deleting the subordinate entry and including the place ID of the subordinate entry in the merged place IDs field 207 of the dominant entry. The process then ends.

As a result of method 500 any node can determine the metadata associated with a place ID or find a place ID for a place with metadata that exactly or partially matches the metadata on hand. According to some embodiments, these processes at PMDS 131 are utilized by a PPIDS 133 to quality control metadata registered for the metadata database and substantially reduce duplicate entries. To prevent malicious creation of new entries, messages to create a new place or update an entry are accepted only from trusted sources, like PPIDS 133.

FIG. 5B is a flowchart of a process 550 at a permanent place ID service (PPIDS), according to one embodiment. In step 551, a metadata data structure is seeded with multiple entries. In some embodiments, step 551 is performed by a different process. In step 553 a request for the PPIDS web page is received and the web page is sent in one or more HTTP messages. The web page provides active areas and forms that a PNSS user can manipulate to perform PNSS functions. In step 555 an HTTP message is received from the user's browser. In some embodiments, step 553 is omitted and the message received in step 555 is sent by a PNSS client 121, e.g., as an HTTP message.

In step 557, in the illustrated embodiment, it is determined whether the message is a registration message, e.g., place registration message 301. If so, then in step 559 it is determined if the registration metadata is valid. Any method may be used to determine if the metadata is valid. For example, in some embodiments, the validity of a postal address is determined based on the commercial LRO services available from NAVTEQ. For example the LRO service can indicate if a given street name does not exist in a given city or within a given postal code, or whether a given house number does not exist for the given street name. Latitude values must lie between 90 degrees South and 90 degrees North; longitude values between 180 degrees West and 180 degrees East.

If the registration metadata is not valid, then in step 561, in the illustrated embodiment, it is determined if the registration metadata can be corrected. If not, an error message, such as error message 305 is returned to the client process in step 563. If the registration metadata can be corrected, such as for misspellings, transposed numeral and missing postal codes or cities, then, in step 565, the registration metadata is corrected to produce valid, corrected registration metadata. In some embodiments, the corrected registration metadata is used in step 567.

In step 567, in the illustrated embodiment, a list of one or more candidate places is generated, with tokens as described above, including a candidate based on corrected registration metadata, if any. In step 569 a place response message with candidates, such as message 307, is returned to the client process. Control then passes to step 555, to receive the next message from the client (e.g., PNSS client 121 or browser 117)

If the metadata is found valid in step 559, or, in some embodiments, corrected in step 565, then, in step 571, the place ID for the valid registration metadata is obtained. For example, a request message with valid registration metadata is sent to the PMDS 331 for processing as described above with reference to FIG. 5A.

In step 573, in the illustrated embodiment, it is determined if the PMDS returns only partial matches, e.g., returns at least one message with a match quality at the third level, but returns no message for a place ID of a perfect match. If so, then a list of candidates is built in step 567 based on those partial matches. In some embodiments all the partial matches are included in the list of candidates. In some embodiments, further processing is performed to determine which, if any, of the partial matches to include in the list of candidates. For example, in some embodiments the fuzzy logic algorithm is applied based on past learning from past selections of candidates. In these embodiments, for example, a place having a partial match with a degree of match rarely selected by a user, is not included in the list of candidates, unless it is the best match. A token is determined for each place included in the list of candidate places. The place response with candidates message is returned in step 569, as described above.

In step 575, in the illustrated embodiment, it is determined if the PMDS returns a perfect match. If so, then the place ID of the place that perfectly matches the valid registration metadata is returned, along with the place resource, e.g., in place response message 303. The process is then complete until the next message is received in step 553 or step 555.

If no perfect match or partial matches are returned, then, in the illustrated embodiment, PMDS returns a message that there is no match for the valid registration metadata. In step 579, the valid registration metadata is sent to the PMDS in a message for creating a new place. The PMDS gets the next place ID and adds a new entry to the place metadata data structure and returns the new place ID., as described above with reference to step 505 through step 509 of FIG. 5A. In step 581 the new place ID is received from the PMDS, and is returned to the client process. The process is then complete until the next message is received in step 553 or step 555.

If the message received is not a registration message, then, in the illustrated embodiment, in step 583, it is determined if the message received is a select candidate message, e.g., message 401. If not, the process is complete until the next appropriate message is received in step 555. If so, then in step 585, the metadata from the selected candidate is reconstructed based on the valid registration data and the token. Furthermore, metrics, for determining which places should be offered as candidates from the set of returned places with partial matches, are reviewed and updated as advantageous. Control then passes to step 587 and following steps to determine if the selected candidate token represents an extant place or a new place, and respond accordingly. If the token refers to an extant place, control passes back to step 577, described above. If the token refers to a new place, then control passes to step 579 and following to create the metadata and return the placeID for the new place.

Figure 6A:
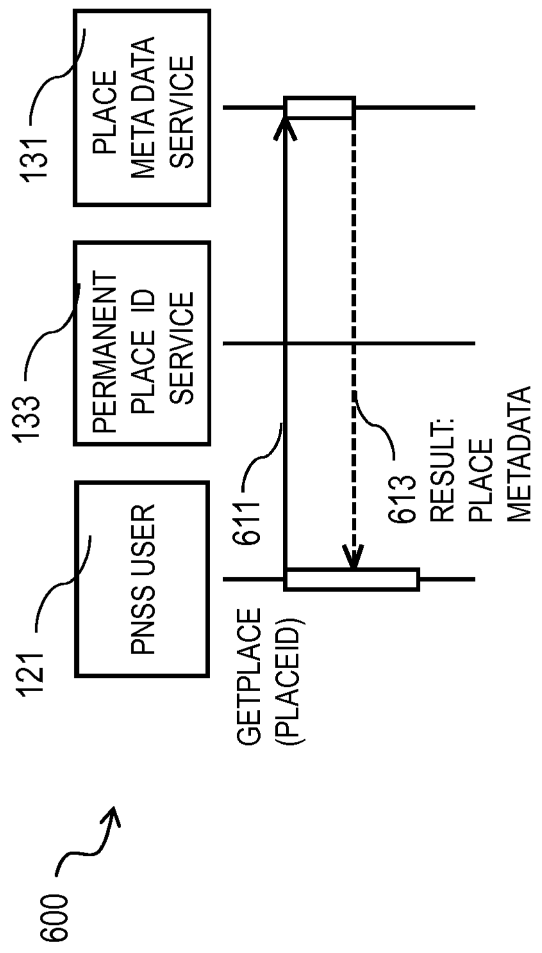
FIG. 6A is a time sequence diagram that illustrates a sequence of messages and processes for accessing place metadata, according to one embodiment.

FIG. 6A is a time sequence diagram that illustrates a sequence of messages and processes 600 for accessing place metadata, according to one embodiment. Time increases downward in this and following time sequence diagrams. A network process on the network is represented by a vertical bar. A message passed from one process to another is represented by horizontal arrows. A step performed by a process is indicated by a box or looping arrow overlapping the process at a time sequence indicated by the vertical position of the box or looping arrow.

The network processes represented in the illustrated embodiment of FIG. 6A are a PNSS user, such as PNSS client process 121, the Permanent Place ID service (PPIDS) 133, and the Place metadata Service (PMDS) 131.

In the illustrated embodiment, The Place Meta Data Service manages metadata of all registered places. Access to the meta data requires place ID for the place. Message 611, getPlace(placeID), is an example of a request place message 411. Message 613, result:place Metadata, is an example of an HTTP message with place metadata as depicted in FIG. 2A, FIG. 2C and FIG. 2D.

Figure 6B:
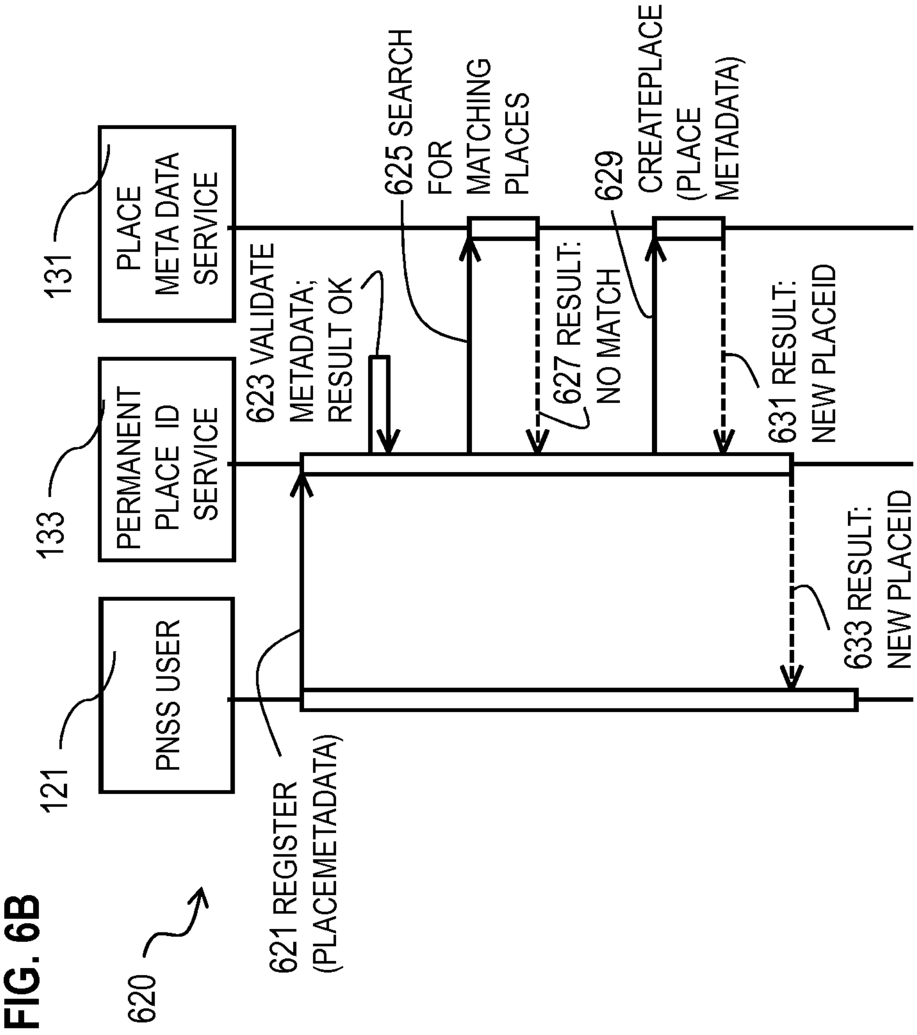
FIG. 6B is a time sequence diagram that illustrates a sequence of messages and processes for registering a valid new place, according to one embodiment.

FIG. 6B is a time sequence diagram that illustrates a sequence of messages and processes 620 for registering a valid new place, according to one embodiment. The network processes represented in FIG. 6B are the same as depicted in FIG. 6A.

The PPIDS 133 manages the registration of new places, in the illustrated embodiment. Therefore the PNSS user 121 has to provide the metadata of the place to the PPIDS in a registration message 621 (e.g., message 301). PPIDS validates the data in process 623. If the data is correct, the PPIDS searches for matching places by sending message 625 to the PMDS 131. If no matching place is available, as indicated in message 627 from the PMDS, PPIDS creates a new place in the PMDS by sending message 629. The new place ID returned by the PDMS to the PPIDS in message 631 is returned to the PNSS user 121 in message 633.

Figure 6C:
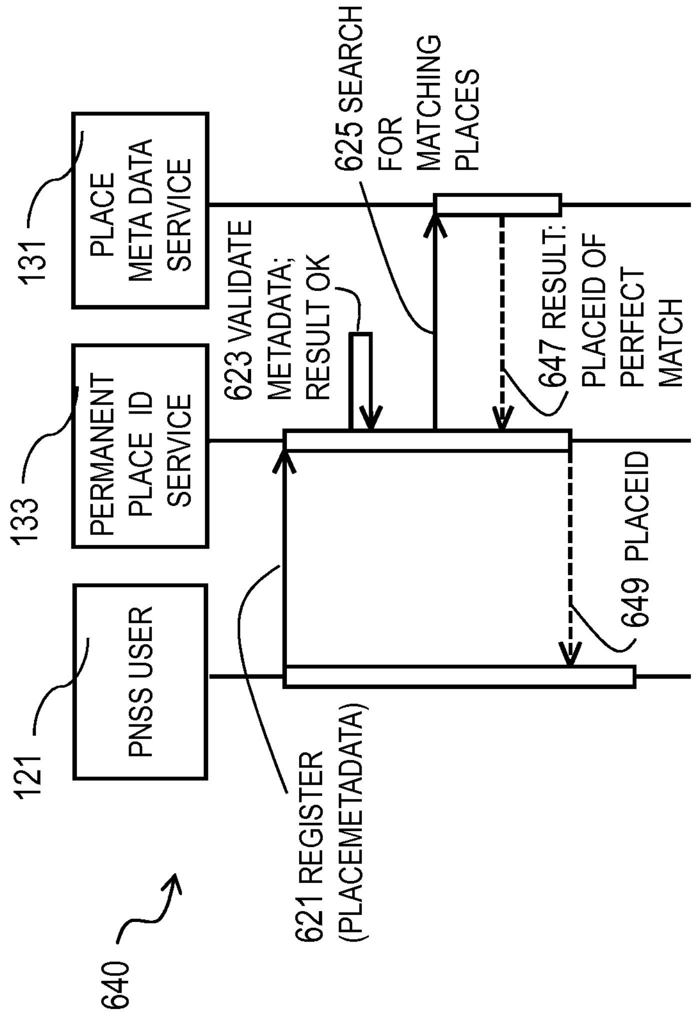
FIG. 6C is a time sequence diagram that illustrates a sequence of messages and processes for registering a matched place, according to one embodiment.

FIG. 6C is a time sequence diagram that illustrates a sequence of messages and processes 640 for registering a matched place, according to one embodiment. The network processes represented in FIG. 6C are the same as depicted in FIG. 6A.

Registering a place that matches perfectly to a preexisting place begins as registering a new place in FIG. 6B, but the lookup in the PMDS will return a perfect matching place in message 647, in the illustrated embodiment. The PPIDS directly returns in message 649 the place ID of the matching place.

Figure 6D:
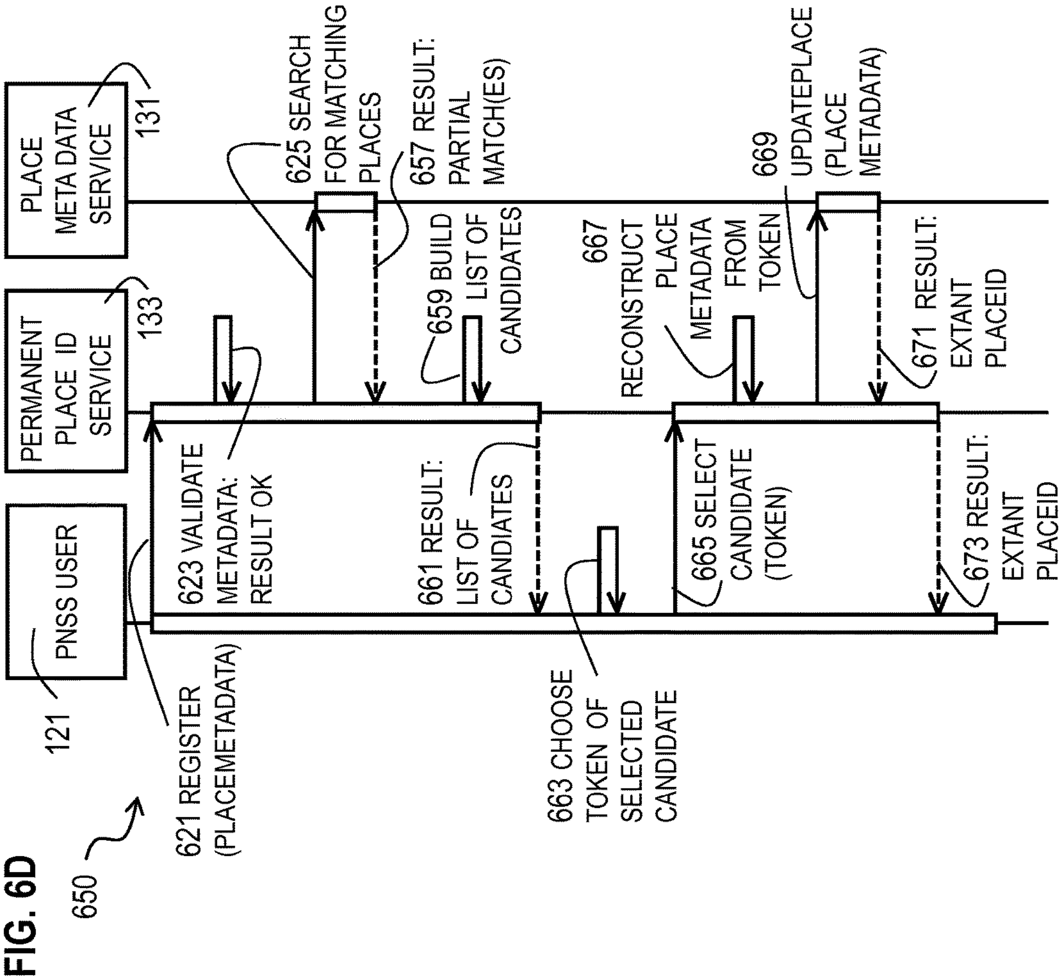
FIG. 6D is a time sequence diagram that illustrates a sequence of messages and processes for registering a partially matched place, according to one embodiment.

FIG. 6D is a time sequence diagram that illustrates a sequence of messages and processes 650 for registering a partially matched place, according to one embodiment. The network processes represented in FIG. 6D are the same as depicted in FIG. 6A.

In case the provided metadata matches only partially to one (or multiple) places in messages 657, PPIDS creates a list of all matching candidates together with a "quality of match" value in process 659, in the illustrated embodiment. The list is sent in message 661 (e.g., in message 307 of FIG. 3D). The user can then select one of these candidates by sending back the selection as a token in message 665 (e.g., in message 401 of FIG. 4A). Based on the selected candidate, the PPIDS reconstructs the candidate metadata from the registration metadata and the token in process 667. The PPIDS sends the registration metadata to the PMDS in an update place message 669 to update the metadata of the selected place based on the registration metadata. The PDMS updates the selected place and sends the place ID of the updated but extant place in message 671. The place ID may have changed if the original partial matched place was merged with another place as a result of the updates. The PPIDS returns in message 673 the place ID of the extant place.

If the user doesn't agree with any of the candidates, the user has to correct the metadata manually and rerun the registration with the new metadata, in the illustrated embodiment.

Figure 6E:
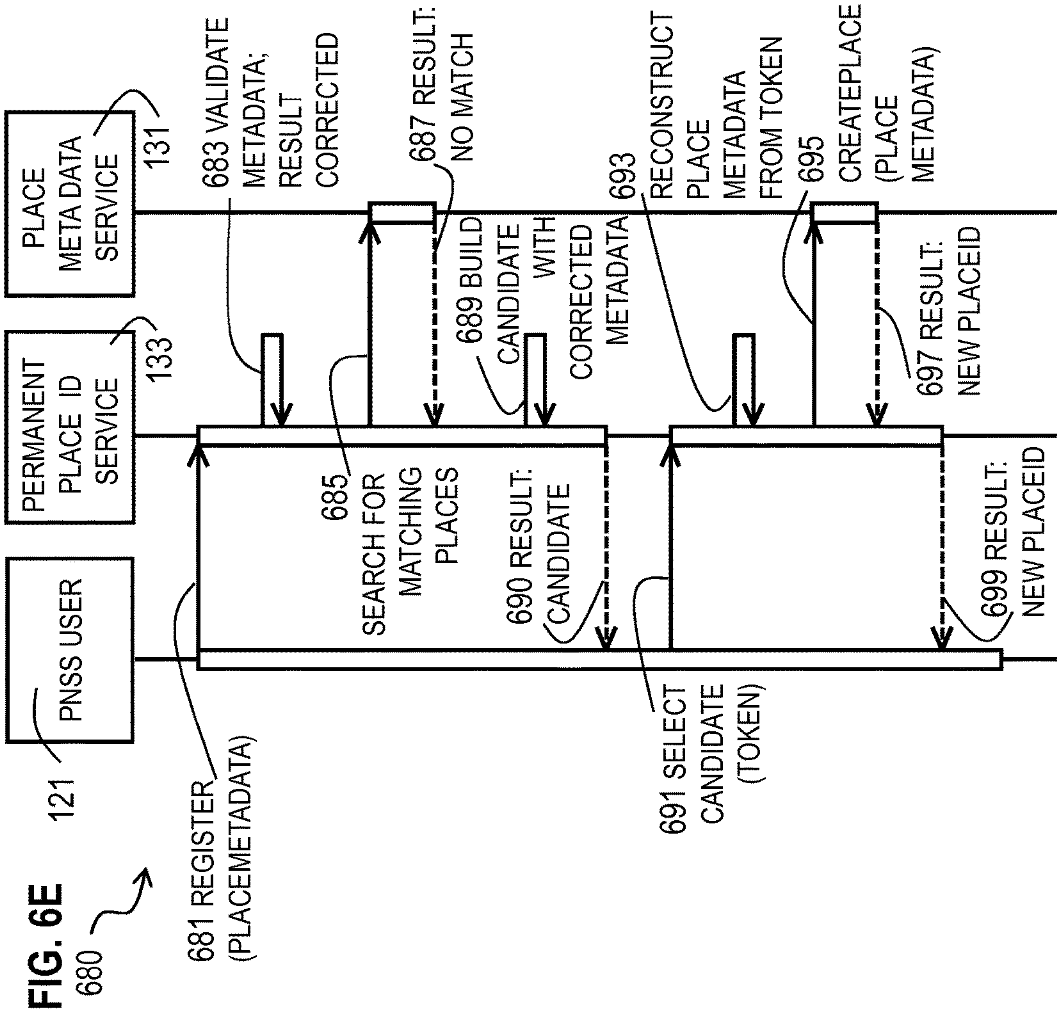
FIG. 6E is a time sequence diagram that illustrates a sequence of messages and processes for registering a partially valid place, according to one embodiment.

FIG. 6E is a time sequence diagram that illustrates a sequence of messages and processes 680 for registering a partially valid place, according to one embodiment. The network processes represented in FIG. 6E are the same as depicted in FIG. 6A.

During validation in process 683, in the illustrated embodiment, PPIDS can automatically fix some issues in the registration metadata received in message 681, such as fixing misspellings and adding Zip code. The PPIDS proceeds as if the corrected data would have been directly provided, e.g., by sending message 685 searching for matching places. Even if no matches are found, as indicated in message 687, PPIDS gives the user the chance to accept the fixes in an additional selection step. Therefore the PPIDS creates a candidate based on the corrected metadata in process 689 and send this together with a "selectToken" object in message 690. If the user agrees with the fixes, the user sends the selectToken object in a selectCandidate request message 691 to the PPIDS. The PPIDS proceeds as if the user would have initially provided the corrected data. If no match is found, as shown in FIG. 6E, PPIDS creates a new place by reconstructing the fixed metadata from the registered metadata and the token in process 693. The reconstructed metadata is used to create the new place by sending it in a creat place message 695. A result message 697 is received with the new place ID, and returned to the PNSS user 121 in message 699.

If a match had been found, then the PPIDS returns the place ID of a matching preexisting place, in the illustrated embodiment, If the user doesn't agree to the fixes, the user he has to modify the registration metadata manually and rerun the registration with the modified meta data The processes described herein for tracking and sharing content playback may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such example hardware for performing the described functions is detailed below.

Figure 7:
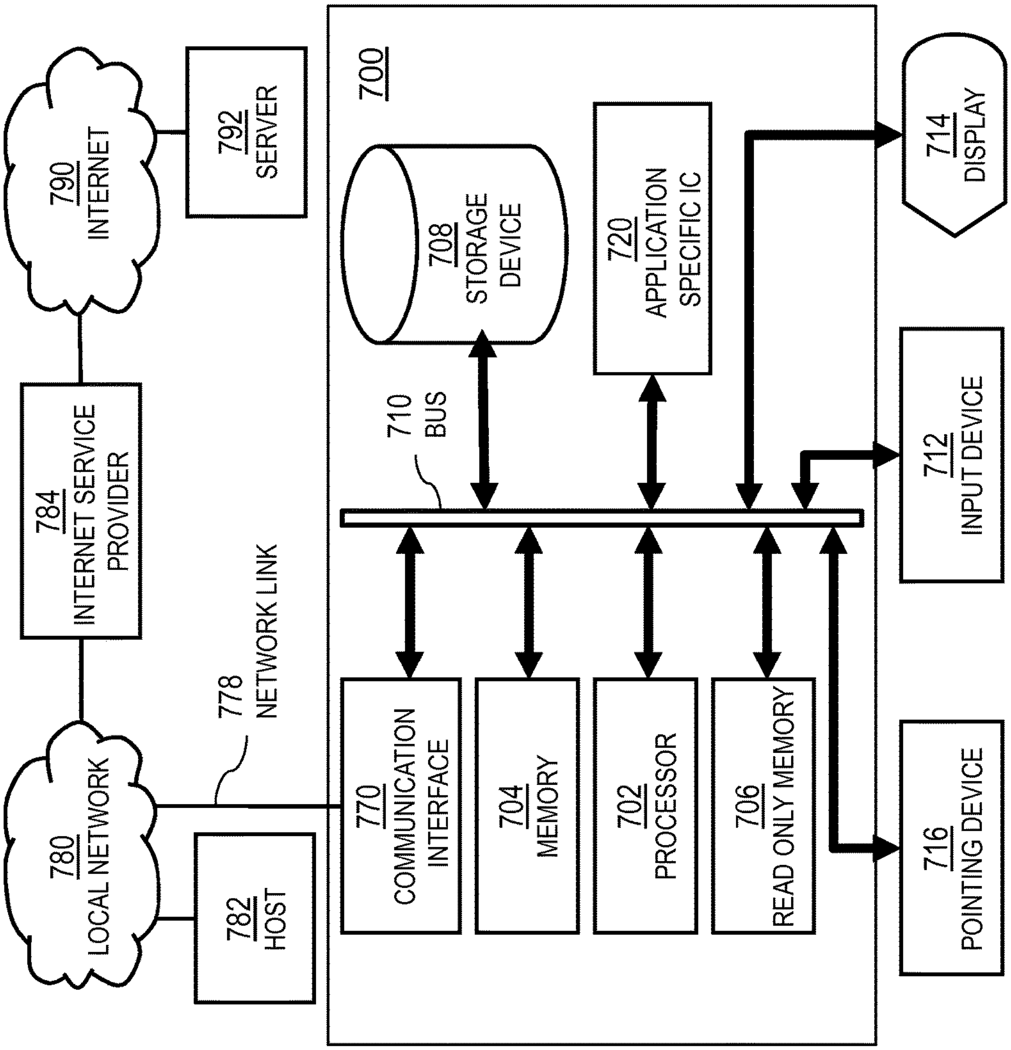
FIG. 7 is a diagram of hardware that can be used to implement an embodiment of the invention.

FIG. 7 illustrates a computer system 700 upon which an embodiment of the invention may be implemented. Computer system 700 includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 710 includes one or more parallel conductors of information so that information is transferred quickly among devices coupled to the bus 710. One or more processors 702 for processing information are coupled with the bus 710.

A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a transmission medium such as a cable or carrier wave, or any other medium from which a computer can read. Information read by a computer from computer-readable media are variations in physical expression of a measurable phenomenon on the computer readable medium. Computer-readable storage medium is a subset of computer-readable medium which excludes transmission media that carry transient man-made signals.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server host 792 connected to the Internet hosts a process that provides a service in response to information received over the Internet. For example, server host 792 hosts a process that provides information representing video data for presentation at display 714.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
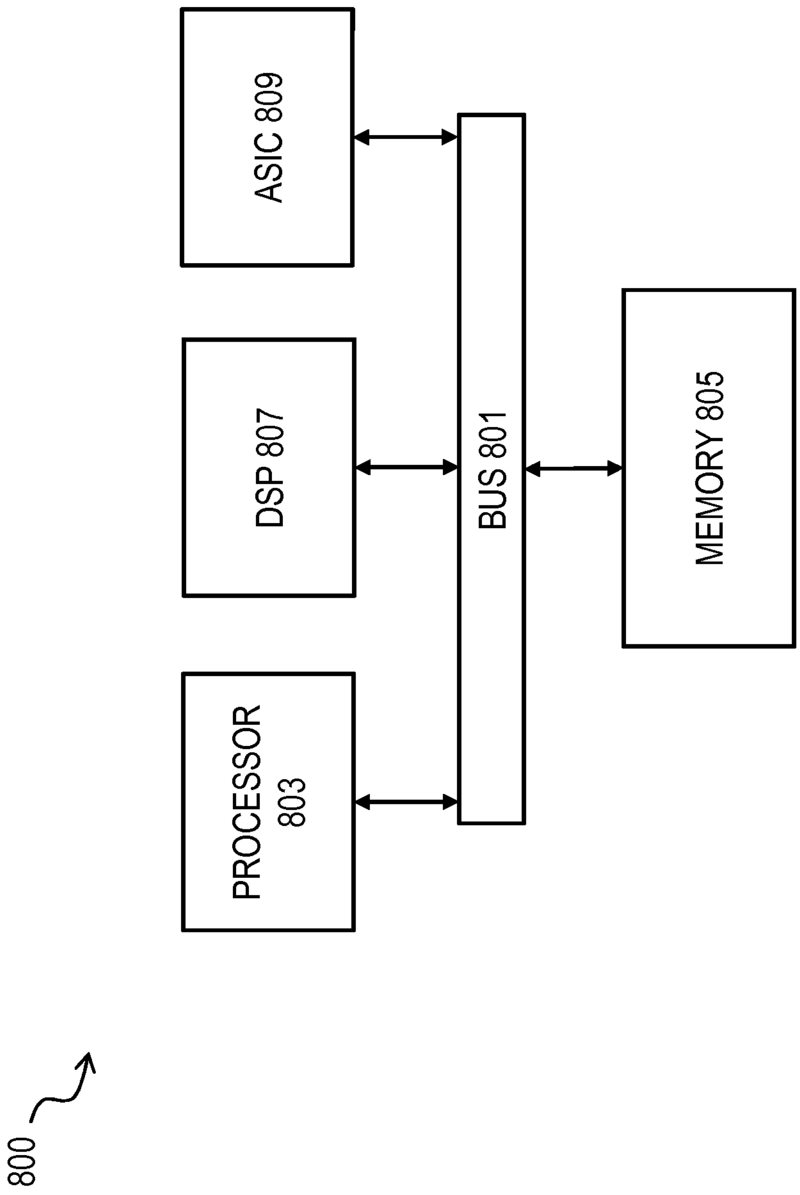
FIG. 8 is a diagram of a chip set that can be used to implement an embodiment of the invention.

FIG. 8 illustrates a chip set 800 upon which an embodiment of the invention may be implemented. Chip set 800 is programmed to carry out the inventive functions described herein and includes, for instance, the processor and memory components described with respect to FIG. 8 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-word signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein. The memory 805 also stores the data associated with or generated by the execution of the inventive steps.

Figure 9:
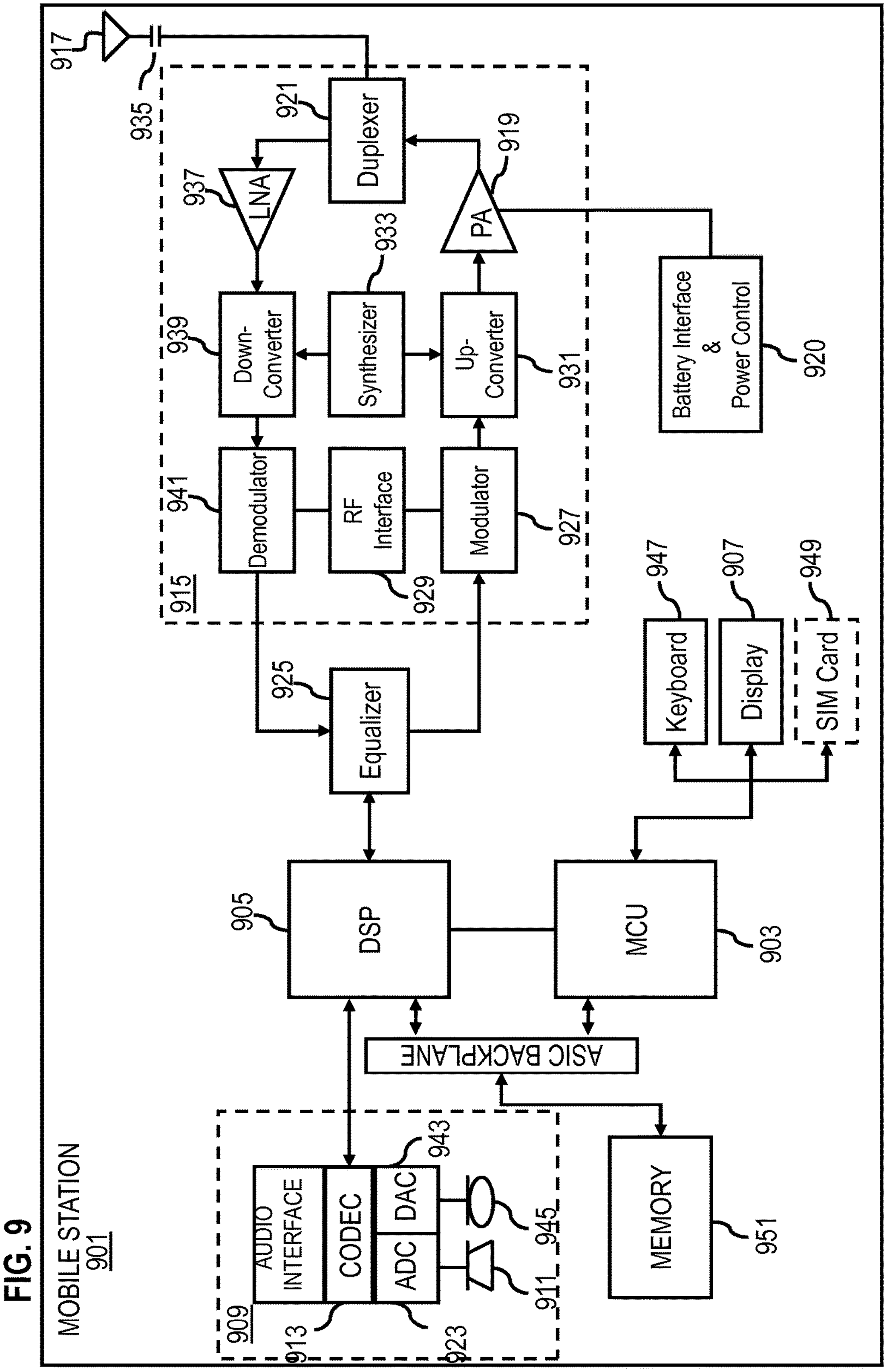
FIG. 9 is a diagram of a terminal that can be used to implement an embodiment of the invention.

FIG. 9 is a diagram of example components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the station include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile station functions. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile station 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In the example embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The MCU 903 delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile station 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile station 901 on a radio network. The card 949 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A non-transitory computer-readable storage medium carrying one or more sequences of one or more instructions which, when executed by one or more processors, cause an apparatus to perform at least the following:

receiving registration data that indicates one or more values for a corresponding one or more attributes that describe a place associated with a geographic location, wherein the one or more attributes include one or more place categories, one or more place names, one or more nearby places, one or more previous place selections by users, or a combination thereof;

determining at least one candidate place that has a degree of match with the place based, at least in part, on the one or more attributes, wherein the degree of match is less than a perfect match and greater than a predetermined threshold value;

building a token for each of the at least one candidate places, wherein the token includes data that indicates a difference of the one or more attributes between the registration data and the respective candidate place, wherein the degree of match includes the token for the respective candidate place, and wherein the one or more attributes of the place are other than the geographic location of the place; and selectively merging the one or more attributes of the place into metadata of the at least one candidate place in a publicly accessible directory, wherein the registration data includes one or more fields that hold the one or more values.

2. A non-transitory computer-readable storage medium of claim 1, wherein the apparatus is caused to further perform:

validating the registration data; and generating a new entry for predetermined places based on the validation of the registration data and a negligible degree of match.

3. A non-transitory computer-readable storage medium of claim 1, wherein the degree of match uses a fuzzy matching algorithm that applies place category matching, place name matching, nearby place matching, previous place selection matching, or a combination thereof.

4. A non-transitory computer-readable storage medium of claim 3, wherein the place name matching includes a unique identifier for the place, the unique identifier corresponding to the entry of the place within a data structure, the predetermined places having been assigned respectively a plurality of unique identifiers within the data structure.

5. A non-transitory computer-readable storage medium of claim 1, wherein the at least one candidate place and the place share at least one identical place category, and the degree of match is based upon place name matching, nearby place matching, previous place selection matching, or a combination thereof.

6. A non-transitory computer-readable storage medium of claim 1, wherein the apparatus is caused to further perform:

creating one or more matching metrics, one or more heuristics, or a combination thereof that score the difference of the one or more attributes and determine which places should be offered as candidate places; and applying the one or more matching metrics, the one or more heuristics, or a combination thereof to subsequent registration data.

7. A non-transitory computer-readable storage medium of claim 6, wherein the apparatus is caused to further perform:

updating the one or more matching metrics, the one or more heuristics, or a combination thereof based on the token, wherein the token includes a unique identifier for the at least one candidate place.

8. A non-transitory computer-readable storage medium of claim 1, wherein the apparatus is caused to further perform:

receiving a candidate selection message that indicates a single token selected by a user; and initiating updating of a set of predetermined places for the at least one candidate place based on the single token.

9. A non-transitory computer-readable storage medium of claim 1, wherein the difference of the one or more attributes includes one or more misspellings, one or more transposed numerals, or a combination thereof of the one or more place categories, the one or more place names, the one or more nearby places, the one or more previous place selections by users, or a combination thereof.

10. A non-transitory computer-readable storage medium of claim 1, wherein the apparatus is caused to further perform:

when there is no candidate place describing the place associated with the geographic location, prompting the user to revise the registration data;

receiving the revised registration data; and processing the revised registration data via the steps of determining, building, and selectively merging of claim 1, wherein the indication of the match includes a plurality of tokens for a plurality of candidate places.

11. A non-transitory computer-readable storage medium of claim 1, wherein the apparatus is caused to further perform initiating sending an error message if the registration data omits a value for a place name attribute, or a place category attribute, or a geographic location attribute.

12. A non-transitory computer-readable storage medium of claim 8, wherein initiating updating of the set of predetermined places for the at least one candidate place based on the single token further comprises initiating deleting or merging one of the predetermined places.

13. A non-transitory computer-readable storage medium of claim 8, wherein the apparatus is caused to further perform learning a heuristic for selecting a candidate place based on the single token selected by the user.

14. An apparatus comprising:

at least one processor; and at least one memory including computer program code for one or more programs, the at least one memory and the computer program code configured to, with the at least one processor, cause the apparatus to perform at least the following, receive registration data that indicates one or more values for a corresponding one or more attributes that describe a place associated with a geographic location, wherein the one or more attributes include one or more place categories, one or more place names, one or more nearby places, one or more previous place selections by users, or a combination thereof;

determine at least one candidate place that has a degree of match with the place based, at least in part, on the one or more attributes, wherein the degree of match is less than a perfect match and greater than a predetermined threshold value;

build a token for each of the at least one candidate places, wherein the token includes data that indicates a difference of the one or more attributes between the registration data and the respective candidate place, wherein the degree of match includes the token for the respective candidate place, and wherein the one or more attributes of the place are other than the geographic location of the place; and selectively merge the one or more attributes of the place into metadata of the at least one candidate place in a publicly accessible directory, wherein the registration data includes one or more fields that hold the one or more values.

15. An apparatus of claim 14, wherein the apparatus is further configured to:

validate the registration data; and create a new entry for predetermined places based on the validation of the registration data and a negligible degree of match.

16. An apparatus of claim 14, wherein the degree of match uses a fuzzy matching algorithm that applies place category matching, place name matching, nearby place matching, previous place selection matching, or a combination thereof.

17. An apparatus of claim 16, wherein the place name matching includes a unique identifier for the place, the unique identifier corresponding to the entry of the place within a data structure, the predetermined places having been assigned respectively a plurality of unique identifiers within the data structure.

18. An apparatus of claim 14, wherein the apparatus is further configured to:

create one or more matching metrics, one or more heuristics, or a combination thereof that score the difference of the one or more attributes and determine which places should be offered as candidate places; and apply the one or more matching metrics, the one or more heuristics, or a combination thereof to subsequent registration data.

19. A system including the apparatus of claim 14, the system further comprising a place-building client configured to send the registration data.

20. A method comprising:

receiving, by an apparatus, registration data that indicates one or more values for a corresponding one or more attributes that describe a place associated with a geographic location, wherein the one or more attributes include one or more place categories, one or more place names, one or more nearby places, one or more previous place selections by users, or a combination thereof, determining, by the apparatus, at least one candidate place that has a degree of match with the place based, at least in part, on the one or more attributes, wherein the degree of match is less than a perfect match and greater than a predetermined threshold value;

building, by the apparatus, a token for each of the at least one candidate places, wherein the token includes data that indicates a difference of the one or more attributes between the registration data and the respective candidate place, wherein the degree of match includes the token for the respective candidate place, and wherein the one or more attributes of the place are other than the geographic location of the place; and selectively merging, by the apparatus, the one or more attributes of the place into metadata of the at least one candidate place in a publicly accessible directory, wherein the registration data includes one or more fields that hold the one or more values.

* * * * *